(12) United States Patent
Sano et al.

(10) Patent No.: US 6,181,491 B1
(45) Date of Patent: Jan. 30, 2001

(54) OPTICAL HEAD DEVICE, INFORMATION RECORDING AND REPRODUCING APPARATUS AND OPTICAL SYSTEM

(75) Inventors: Kousei Sano, Neyagawa; Shin-ichi Kadowaki, Sanda, both of (JP)

(73) Assignee: Matsushita Electric Industrial Co., Ltd., Osaka (JP)

(*) Notice: Under 35 U.S.C. 154(b), the term of this patent shall be extended for 0 days.

(21) Appl. No.: 09/366,373

(22) Filed: Aug. 3, 1999

(30) Foreign Application Priority Data

Aug. 5, 1998 (JP) ................................. 10-221397

(51) Int. Cl.[7] ....................................... G02B 7/02
(52) U.S. Cl. ................. 359/824; 250/201.5; 369/44.11; 369/44.21; 369/44.23
(58) Field of Search ................. 359/824; 250/201.5; 369/44.11, 44.22, 44.23, 44.14, 44.21

(56) References Cited

U.S. PATENT DOCUMENTS

| | | | |
|---|---|---|---|
| 5,844,879 | * 4/1999 | Morita et al. | 369/118 |
| 5,854,671 | * 12/1998 | Nishi | 355/53 |
| 5,892,741 | * 4/1999 | Kadowaki et al. | 369/44.29 |
| 6,011,269 | * 1/2000 | Veneklasen et al. | 250/492.23 |

OTHER PUBLICATIONS

Yajun Li and Emil Wolf, Three–Dimensional Intensity Distribution Near the Focus in Systems of Different Fresnel Numbers, J. Opt. Soc. Am. A, vol. 1, No. 8, Aug. 1984, pp. 801–808.

* cited by examiner

*Primary Examiner*—Georgia Epps
*Assistant Examiner*—Tim Thompson
(74) *Attorney, Agent, or Firm*—Rosenthal & Osha L.L.P.

(57) ABSTRACT

An optical head device capable of stably positioning an information head device even if a distance between the object point and the image point is reduced so as to miniaturize the device can be realized. The optical head device comprises a semiconductor laser emitting a light beam, a lens converging the light beam emitted from the semiconductor laser to a disk and a holding means maintaining the disk at a constant distance from the lens. The optical head device satisfies the following equations 24 and 25:

$$L2 = f \times L1/(L1-f) \quad \text{(equation 24)}$$
$$h < L2 \quad \text{(equation 25)}$$

wherein f denotes a focal length of the lens, L1 denotes a distance between the semiconductor laser and a first principal point located on the semiconductor laser side of the lens and h denotes a distance between a second principal point located on the disk side of the lens and the disk that is held by the holding means.

18 Claims, 20 Drawing Sheets

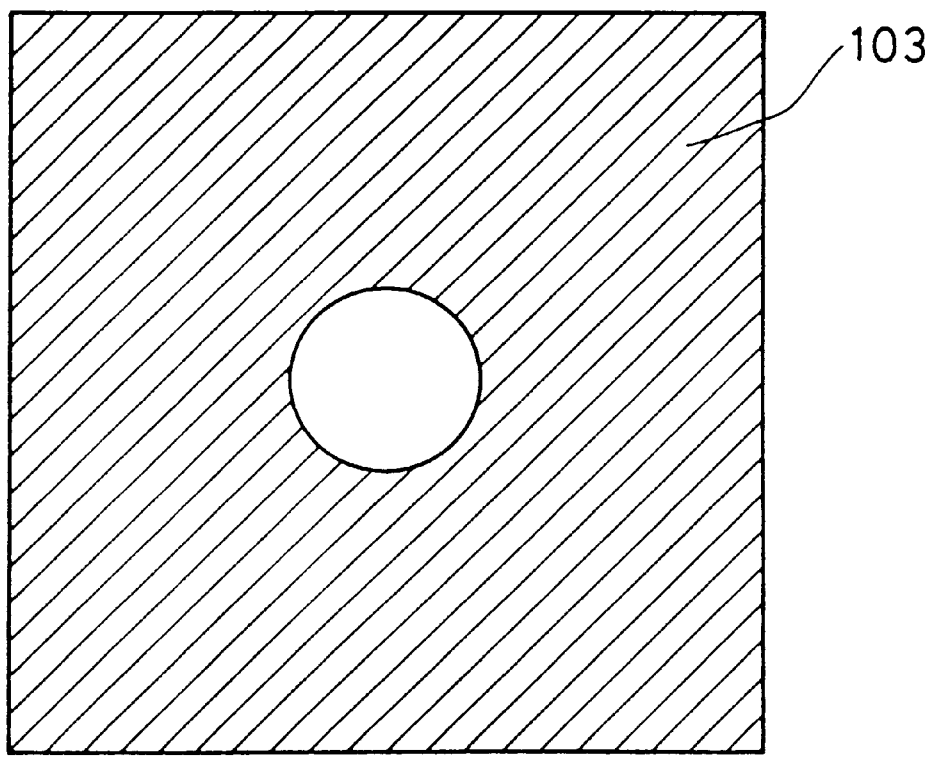
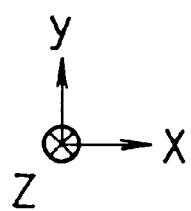
FIG.2

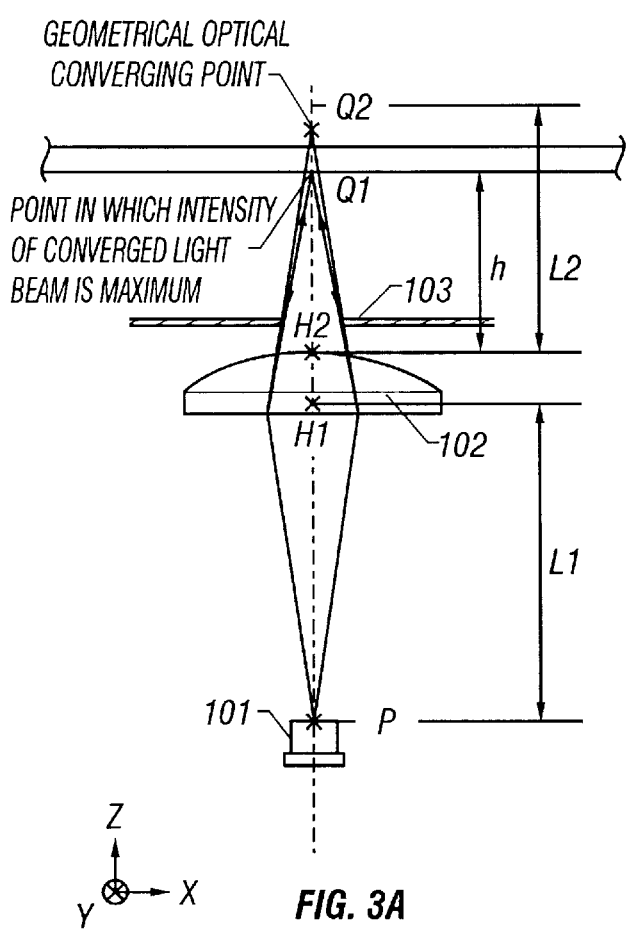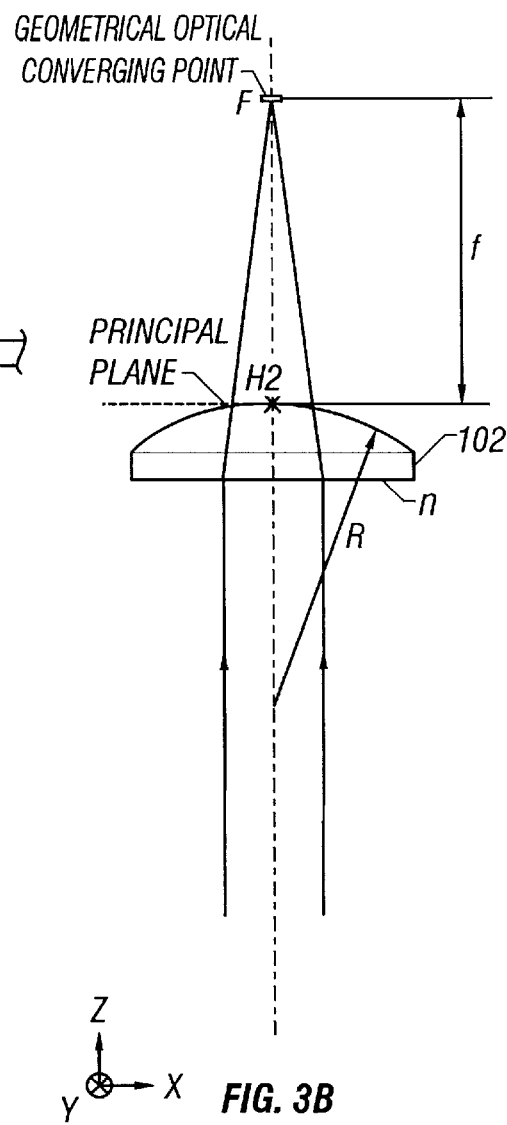
FIG. 3A
FIG. 3B

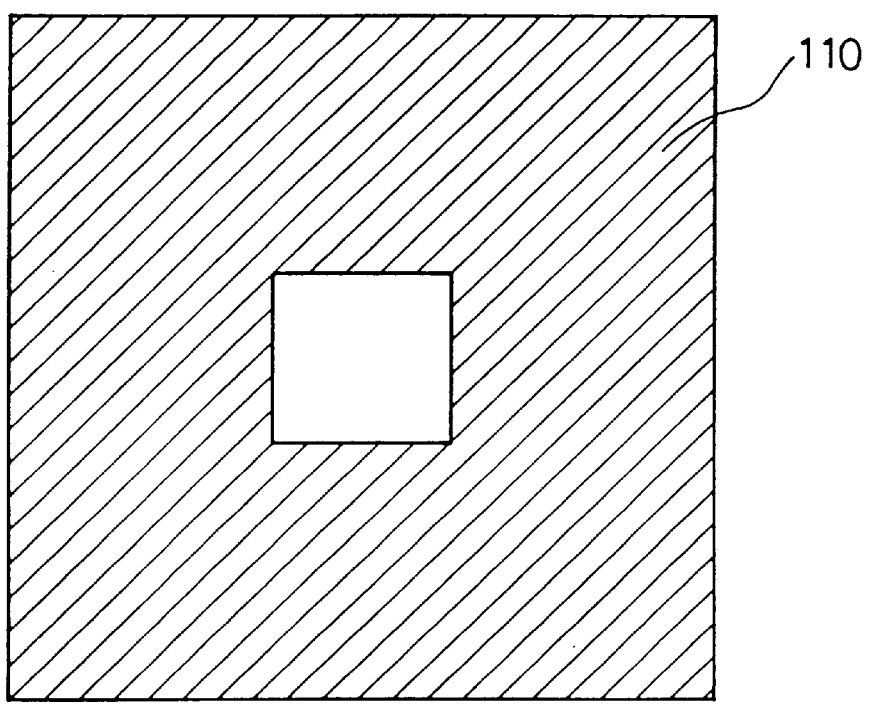
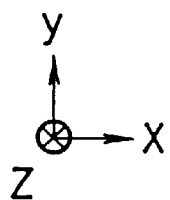
FIG.4

OPTICAL HEAD DEVICE, INFORMATION RECORDING AND REPRODUCING APPARATUS AND OPTICAL SYSTEM

FIELD OF THE INVENTION

The present invention relates to an optical head device for positioning an information head device when information is recorded on an information recording medium such as a high density floppy disk or an optical disk, etc., or reproducing the information recorded on the information recording medium, an information recording and reproducing apparatus, for example, a floppy disk drive, an optical disk drive, etc., provided with the aforementioned optical head device, and an optical system capable of obtaining light beam having a desired wave surface and useful for the optical head device and information recording and reproducing apparatus.

BACKGROUND OF THE INVENTION

When information is recorded on a floppy disk at high density, the positioning of an information head device in the direction perpendicular to a track is required. In this case, if the positioning of the information head device is mechanically conducted, sufficient positioning accuracy cannot be secured. Therefore, recently, the positioning of the information head device has mainly been conducted by using light beam.

Hereinafter, a conventional optical head device in which the positioning of the information head device is conducted by using a light beam will be described with reference to FIG. 20.

As shown in FIG. 20, a light beam emitted from a semiconductor laser 101 serving as a light source is divided into a zero-order light beam and a ±first order diffracted light beam (±first order diffracted light beam is not shown) by a diffraction grating 152 provided on the surface of a diffraction element 150 at the side of the light source. Hereinafter, the zero-order light beam will be referred to as "the main beam" and the ±first order diffracted light beam will be referred to as "the sub-beam".

The main beam and sub-beam pass through a diffraction grating 151 provided on the surface of the diffraction element 150 at the side of a lens 102 and are converged by the lens 102 serving as an converging optical system. The main beam and sub-beam converged by the lens 102 are limited to the desired numerical aperture NA by an aperture stop 103 and irradiate a disk 104 serving as an information recording medium. On the disk 104, a line connecting the main beam spot and two sub-beam spots is arranged so as to have a predetermined angle with respect to a track. Moreover, the disk 104 is sandwiched by magnetic heads 201 being attached to an arm 211 and serving as the information head device, and thus the position of the disk 104 in the direction of the z-axis is regulated. Furthermore, each member of the optical system and the magnetic heads 201 are fixed in a frame 210. Thus, the distance between the optical system and the disk 104 always remains constant (20 mm in this case).

The light beam reflected from the disk 104 passes through the aperture stop 103 and the lens 102 again, is diffracted at the diffraction grating 151 provided on the surface of the diffraction element 150 at the side of the lens 102, and then enters the photo detectors 105R and 105L.

Each of the photo detector 105R and 105L consists of three detecting regions respectively, receives the main beam and two sub-beams separately and outputs signal in accordance with the quantity of the received light.

On the disk 104, three beam spots irradiate the different positions in the direction perpendicular to the track. Therefore, the modulation degrees of signals obtained by the three detecting regions are different from each other. The modulation degree of signal is sequentially changed as these beam spots cross the track. Therefore, by calculating these signals, the relative position relationship between the track and the beam irradiation position can be detected.

Namely, first, an envelope detection of these signals is conducted and the obtained envelope signals are defined as M, S1 and S2. Next, by using these envelope signals M, S1 and S2, the calculation of A=M−S1 and B=S2−M are conducted so as to generate signals A and B. By multiplying the signals A and B by an appropriate factor k1, tracking error signals k1·A and k1·B, which zero-cross in optional phases, are obtained. By using these tracking error signals k1·A and k1·B, the relative position relationship between the track and the beam irradiation position can be detected. Herein, the factor k1 is initially learned so that the magnetic head 201 is positioned on the track for recording and reproducing information. Moreover, both the magnetic head 201 and the optical system move in the radius direction of the disk 104 by a moving means 203 shown in FIG. 7.

In the above-mentioned conventional optical head device, the lens 102 having a focal length f of 10 mm is used. When the optical system of single magnification is constructed as in FIG. 20, the distance between the semiconductor laser 101 serving as the light source and a light converging point of the disk 104 serving as an information recording medium (the distance between an object point and an image point) is about 40 mm, and the distance L2 between the lens 102 and a geometrical optical converging point is 20 mm. Furthermore, when the numerical aperture NA is 0.04, the radius a of the opening in which the aperture stop 103 having the opening of radius a' is projected on the principal plane of the disk side of the lens 102 is 800 $\mu$m. Furthermore, when the wavelength $\lambda$ of the light beam emitted from the semiconductor laser 101 serving as the light source is 800 nm, a spot diameter d=$\lambda$/NA on the disk 104 is 20 $\mu$m, and the Fresnel number N=(a×a)/($\lambda$×L2) is 40. In addition, the positional difference between the geometrical optical converging point and a point in which the intensity of the converged light is maximum is about 20 $\mu$m. Since the focal depth $\Delta z$ that is a distance between the point in which the intensity of the converged light is maximum and the point in which the intensity of the converged light is 80% of the maximum is about 80 $\mu$m, this positional difference is substantially negligible.

However, in the above-mentioned conventional optical head device, it is necessary to increase the distance between the object point and the image point so that the positional difference between the geometrical optical converging point and the point in which the intensity of the converged light is maximum is substantially negligible. Accordingly, it is impossible to miniaturize the optical head device. Furthermore, when the distance between the object point and the image point is longer, the light beam emitted from the light source of the optical head device is susceptible to environmental changes such as change of temperature or vibration. Thus, a stable positioning of the information head device cannot be conducted.

SUMMARY OF THE INVENTION

It is therefore an object of the present invention to provide an optical head device capable of stably positioning an information head device even if a distance between an object point and an image point is small so as to miniaturize the device, and an information recording and reproducing device including this optical head device and an optical system useful for the optical head device or the information recording and reproducing device.

In order to achieve the above-mentioned object, an optical head device of the present invention comprises a light source emitting a light beam, a converging optical system converging the light beam emitted from the light source to an information recording medium on which information is recorded, and a holding means maintaining a distance between the information recording medium and the converging optical system constant. The optical head device satisfies the following equations 9 and 10:

$$L2=f\times L1/(L1-f) \quad \text{(equation 9)}$$

$$h<L2 \quad \text{(equation 10)}$$

wherein f denotes a focal length of the converging optical system, L1 denotes a distance between the light source and a first principal point located at the side of the light source of the converging optical system, h denotes a distance between a second principal point located at the side of the information recording medium of the converging optical system and the information recording medium held by the holding means.

According to the configuration of this optical head device, even if a point in which the intensity of the converged light beam is maximum is shifted from the geometrical optical converging point, the information recording medium can be arranged at the point in which the light intensity is maximum. Therefore, the distance between the object point and image point can be reduced so as to miniaturize the device. Furthermore, since the distance between the object point and image point can be reduced, the light beam emitted from the light source is less susceptible to environmental changes such as change of temperature or vibration. Namely, according to the configuration of this optical head device, miniaturization of the device can be realized and furthermore signals for positioning the information head device can stably be obtained.

Furthermore, in the configuration of the above-mentioned optical head device of the present invention, it is preferable that the following equations 11 and 12 are satisfied:

$$\Delta z=\lambda/(2\pi\times NA\times NA) \quad \text{(equation 11)}$$

$$h<L2-\Delta z \quad \text{(equation 12)}$$

wherein $\lambda$ denotes a wavelength of the light beam emitted from the light source and NA denotes a numerical aperture at the side of the information recording medium of the converging optical system.

According to such a preferable configuration, sufficient signals for positioning the information head device can be obtained.

Furthermore, in the configuration of the above-mentioned optical head device of the present invention, it is preferable that the converging optical system comprises an aperture stop determining the numerical aperture and the aperture stop has a circular opening. According to such a preferable configuration, a shift between the geometrical optical converging point and the point in which the intensity of the converged light beam is maximum is constant regardless of directions, so that a converging spot with little or no astigmatism can be obtained. Furthermore, in this case, it is preferable that a Fresnel number N defined by the following equation 13 is 10 or less:

$$N=(a\times a)/(\lambda\times L2) \quad \text{(equation 13)}$$

wherein a denotes a radius of an opening of the projected aperture stop on a principal plane of the information recording medium side of the converging optical system and $\lambda$ denotes a wavelength of the light beam emitted from the light source, and wherein the principal plane is a plane containing the second principal point and is perpendicular to an optical axis.

According to such a preferable configuration, the distance between the object point and image point can be reduced by using the lens having the same focal length. Therefore, the device can further be miniaturized. On the contrary, when the distance between the object point and image point is the same, the focal length of the lens can be increased, so that the radius of curvature of the lens can be increased. As a result, the lens can easily be manufactured.

Furthermore, in the configuration of the above-mentioned optical head device of the present invention, it is preferable that the converging optical system comprises an aperture stop determining the numerical aperture and the aperture stop has a square opening. According to such a preferable configuration, a shift between the geometrical optical converging point and the point in which the intensity of the converged light beam is maximum can be substantially constant regardless of directions by using the aperture stop having a simple shape, so that a converging spot with little or no astigmatism can be obtained.

Furthermore, in the configuration of the above-mentioned optical head device of the present invention, it is preferable that the converging optical system comprises a aperture stop determining the numerical aperture and the aperture stop has an opening having a different width depending upon directions. According to such a preferable configuration, a shift between the geometrical optical converging point and the point in which the intensity of the converged light is maximum differs depending upon directions, so that astigmatism can be generated. Moreover, this astigmatism can compensate the astigmatism which the light source or the optical system originally has, and thus a converging spot with little or no astigmatism can be obtained. Furthermore, since the astigmatism of light source, etc. can be mostly or completely removed by such a simple configuration, an optical head device having high performance can be realized at low cost. Furthermore, in this case, it is preferable that a minimum Fresnel number $N_{min}$ defined by the following equation 14 is 10 or less:

$$N_{min}=(a1\cdot a1)/(\lambda\cdot L2) \quad \text{(equation 14)}$$

wherein a1 denotes a half value of the minimum width of an opening of the projected aperture stop on a principal plane of the information recording medium side of the converging optical system and $\lambda$ denotes a wavelength of the light beam emitted from the light source, and wherein the principal plane is a plane containing the second principal point and is perpendicular to an optical axis.

According to such a preferable configuration, the distance between the object point and image point can be reduced by using the lens having the same focal length. Therefore, the device can further be miniaturized. On the contrary, when the distance between the object point and image point is the same, the focal length of the lens can be increased, so that the radius of curvature of the lens can be increased. As a result, the lens can easily be manufactured.

Furthermore, an information recording and reproducing apparatus of the present invention comprises an information head device recording information on an information recording medium or reproducing the information recorded on the information recording medium, an optical head device positioning the information head device, a moving means relatively moving the position of the information head device and the information recording medium, wherein the optical head device of the present invention is used as the optical head device. According to the configuration of this information recording and reproducing device, the overall size of the information recording and reproducing device can be smaller. Furthermore, the information recording and reproducing apparatus is less susceptible to environmental changes such as change of temperature or vibration, and thus a stable recording and reproducing of the information is possible.

Furthermore, in the configuration of the above-mentioned information recording and reproducing apparatus of the present invention, it is preferable that the optical head device serves as the information head device. According to such a preferable configuration, a magnetic head or the like is not required, and thus an information recording and reproducing apparatus having simpler structure can be realized.

Furthermore, an optical system of the present invention comprises a light source emitting a light beam, a converging optical system converging the light beam emitted from the light source and an aperture stop determining the numerical aperture of the converging optical system, wherein the aperture stop has an opening having a different width depending upon directions, a minimum Fresnel number $N_{min}$ defined by the following equations 15 and 16 is 10 or less:

$$L2 = f \times L1/(L1-f) \quad \text{(equation 15)}$$

$$N_{min} = (a1 \cdot a1)/(\lambda \cdot L2) \quad \text{(equation 16)}$$

wherein f denotes a focal length of the converging optical system, L1 denotes a distance between the light source and a first principal point located at the side of the light source of the converging optical system, a1 denotes a half value of the minimum width of an opening of the projected aperture stop on a principal plane of an information recording medium side of the converging optical system and λ denotes a wavelength of the light beam emitted from the light source, and wherein the principal plane is a plane containing a second principal point located at the side of the information recording medium of the converging optical system and is perpendicular to an optical axis.

According to the configuration of this optical system, with a small size and simple component and without adding a new glass component, etc., astigmatism can be provided to the converging optical system, or astigmatism of the converging optical system can easily be removed. Furthermore, coma does not occur as in the case where a parallel-plate glass is inclined and used.

BRIEF DESCRIPTION OF THE DRAWINGS

FIG. 2 is a plan view showing one example of an aperture stop used for an optical head device in a first embodiment according to the present invention.

FIG. 3a is a schematic cross sectional view showing the positional relationship of each member forming an optical system of an optical head device in a first embodiment according to the present invention.

FIG. 3(b) is a conceptional view showing a lens and a geometrical optical converging point F.

FIG. 4 is a plan view showing another example of an aperture stop used for an optical head device in a first embodiment according to the present invention.

DETAILED DESCRIPTION OF THE INVENTION

Hereinafter, the present invention will be described more specifically by way of its preferred embodiments.

First Embodiment

Hereinafter, the same numeral references are given for the same members in all figures. Furthermore, the direction of a coordinate axis shown in the lower left part of each figure indicates the directional relationship between this figure and the other figures.

First, a first embodiment of the present invention will be described with reference to FIGS. 1 to 7.

Figure 1:
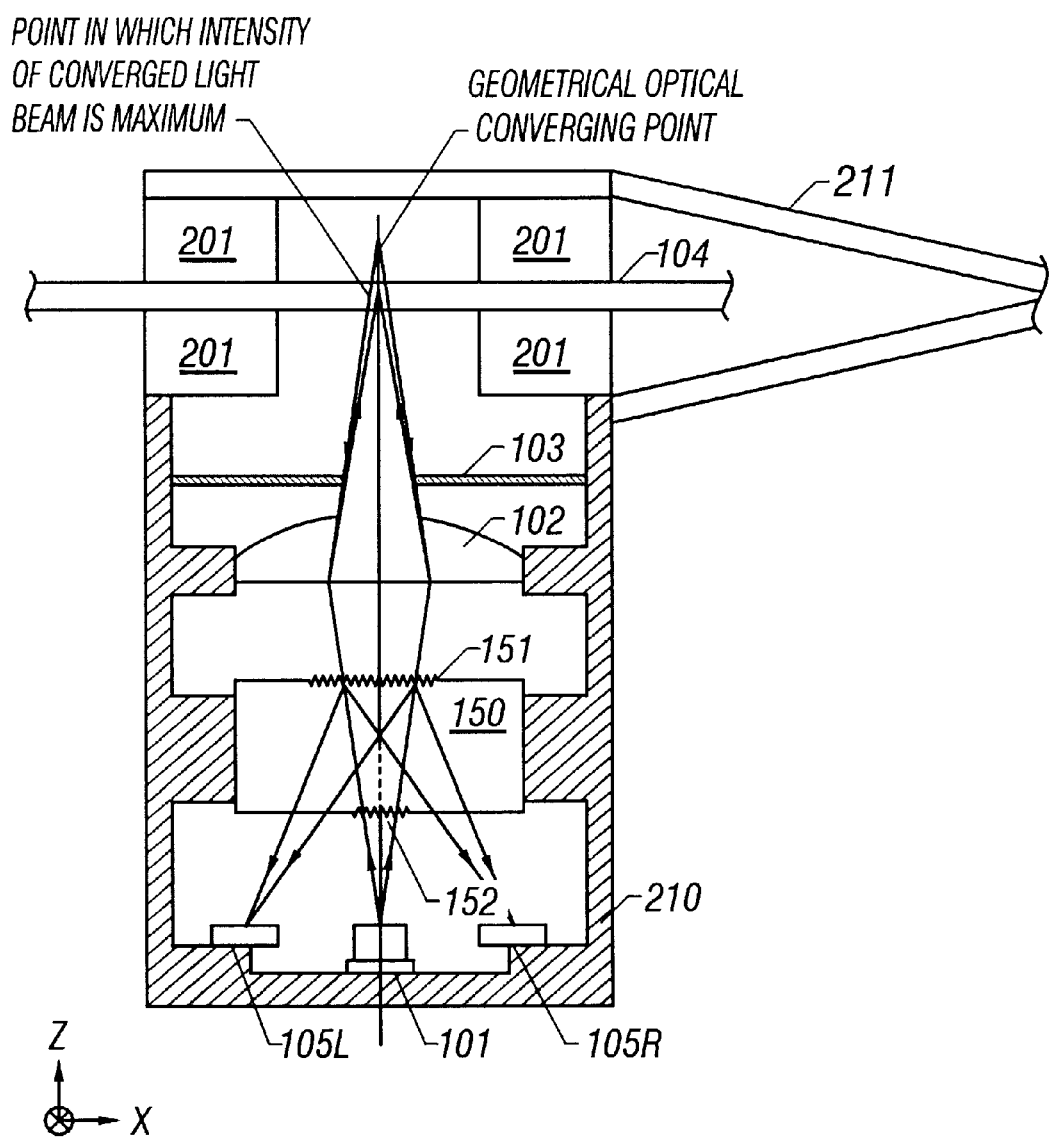
FIG. 1 is a schematic cross sectional view showing a configuration of an optical head device in a first embodiment according to the present invention.

FIG. 1 is a schematic cross sectional view showing a configuration of an optical head device in a first embodiment according to the present invention.

As shown in FIG. 1, a light beam emitted from a semiconductor laser 101 serving as light source is divided into a zero-order light beam and a ±first order diffracted light beam (±first order diffraction light beam is not shown) by a 3-beam diffraction grating 152 provided on the surface of a diffraction element 150 on the side of the light source. Hereinafter, the zero-order light beam will be referred to as "the main beam" and the ±first order diffracted light beam will be referred to as "the sub-beam".

The main beam and two sub-beams pass through a detecting diffraction grating 151 provided on the surface of the diffraction element 150 on the side of the lens and are converged by a lens 102 serving as a converging optical system. Moreover, when a light beam passes through the detecting diffraction grating 151, diffracted light beams are generated, but they are not shown in FIG. 1 because they are not necessary. The main beam and two sub-beams converged by the lens 102 are limited to the desired numerical aperture NA by an aperture stop 103 and irradiate the disk 104 serving as the information recording medium. On the disk 104, a line connecting the main beam spot and two sub-beam spots is arranged so as to have a predetermined angle with respect to a track.

Moreover, the disk 104 is sandwiched by magnetic heads 201, which are attached to an arm 211 and serve as the information head device, and thereby the position of the disk 104 is regulated in the direction of a z-axis. Furthermore, each member of the optical system (the semiconductor laser 101, the diffraction element 150, the lens 102, the aperture stop 103 and the photo detector 105) and the magnetic head 201 are fixed in a frame 210. Thus, the distance between the optical system and the disk 104 always remains constant. Herein, the magnetic head 201, the frame 210 and the arm 211 serve as a holding means having a predetermined length.

The light beams reflected from the disk 104 pass through the aperture stop 103 and the lens 102 again, are diffracted at the detecting diffraction grating 151 and then enter the photo detectors 105R and 105L.

Each of the photo detectors 105R and 105L consists of three detecting regions respectively, receives the main beam and two sub-beams separately, and outputs signals in accordance with the quantity of the received light. When the three beams enter the disk 104, they form three spots on the disk 104 and irradiate the different positions in the direction perpendicular to the track. Consequently, the modulation degrees of signals obtained by the three detecting regions are different from each other. Therefore, by calculating these signals, the relative position relationship between the track and the beam irradiation position can be detected. Moreover, recording information on the disk 104 or reproducing the information recorded on the disk 104 are conducted by the magnetic head 201 serving as the information head device.

FIG. 2 is a view of the aperture stop 103 of FIG. 1 shown from the direction of an optical axis. As shown in FIG. 2, the aperture stop 103 is provided with a circular opening having a radius a with a center at an optical axis.

FIG. 3 is a view showing the position relationship of each member forming the optical system of the optical head device in this embodiment. In FIG. 3, P denotes a light-emitting point of the semiconductor laser 101 serving as the light source, H1 denotes a first principal point located on the light source side of the lens 102 serving as the converging optical system, H2 denotes a second principal point located on the disk side of the lens 102, f denotes a focal length of the lens 102, and L1 denotes a distance between the point P and the point H1. A geometrical optical converging point Q2 is positioned apart from the point H2 by a distance L2. Herein, the distance L2 can be calculated by the following equation 17.

$$L2 = f \times L1/(L1-f) \quad \text{(Equation 17)}$$

Furthermore, the focal length f of the lens 102 is a distance between the second principal point H2 and the geometrical optical converging point F when the parallel light beams enter the lens 102 as shown in FIG. 3(b). When the lens 102 is made of a plano-convex lens as shown in FIG. 3(b), the focal length f of the lens 102 is expressed by the following equation 18.

$$f = R/(n-1) \quad \text{(equation 18)}$$

wherein R denotes a radius of curvature of the lens 102 and n denotes refractive index of the lens 102.

A point Q1 is a point in which the intensity of the converged light beam is maximum. In this embodiment, the disk 104 is positioned at the point Q1 that is apart from the point H2 by a distance h (<L2) by the magnetic head 201, etc. serving as the holding means (see FIG. 1).

In this embodiment, when a plano-convex lens having a focal length f of 1 mm is used as the lens 102 and L1 is set 2.0 mm, the resultant optical system has a distance between the object point and the image point of about 4 mm. In this case, L2 is 2.0 mm. When the numerical aperture NA is 0.04, the radius a of the opening in which the aperture stop 103 having the opening of radius a' is projected on the principal plane of the disk side of the lens 102 is 80 μm, the spot diameter d of the beam spot on the disk 104 is 20 μm. The principal plane is a plane containing the second principal point H2 and is perpendicular to the optical axis. Moreover, the Fresnel number N expressed by the following equation 19 is 4.

$$N = (a \times a)/(\lambda \times L2) \quad \text{(equation 19)}$$

At this time, the distance z1 between the geometrical optical converging point Q2 and the point Q1 in which the intensity of the converged light is maximum is about 130 μm. On the other hand, the focal depth Δz, that is, a distance between the point in which the intensity of the converged light beam is maximum and the point in which the intensity of the converged light is 80% of the maximum is about 80 μm. Therefore, when the optical system is designed by using the geometrical optics, the light beam is defocused on the disk 104 serving as the information recording medium. As a result, the desired property cannot be easily obtained.

The fact that the positions of the geometrical optical converging point and the point in which the intensity of the converged light beam is maximum are different from each other when the Fresnel number is small is described in detail in "Y. Li and E. Wolf: Opt. Soc. Am. A (1984) vol. 1, p801–808". Therefore, the explanation of its principle is omitted herein.

Therefore, when the Fresnel number N is small (N≦10), designing of the lens and optical positioning should be conducted in taking the above-mentioned fact into consideration. In other words, when the Fresnel number N is small and the point Q1 in which the intensity of the converged light beam is maximum is shifted from the geometrical optical converging point Q2, in particular, when these two points are shifted from each other beyond the actual focal depth Δz, it is necessary to arrange the disk 104 at the position of the point Q1 in which the light intensity is actually maximum, or set the geometrical optical converging point Q2 at more distant position from the disk 104 by designing the focal length f of the lens 102 longer.

k denotes the wave number of light, a denotes a radius of the opening in which the aperture stop 103 having the opening of radius a' is projected on the principal plane of the disk side of the lens 102, L2 denotes a distance between the second principal point H2 of the lens 102 and the geometrical optical converging point Q2, and z1 denotes a distance between the geometrical optical converging point Q2 and the point Q1 in which the intensity of the converged light beam is maximum. Moreover, the z1 has a negative value when the point Q1 is positioned closer to the lens 102 than the point Q2.

The z satisfying the following equations 20 and 21 is z1 (−L2<z1<0). The shift between the point Q1 in which the intensity of the converged light beam is maximum and the geometrical optical converging point Q2 is expressed by |z1|.

$$A = k \times a \times a / (4 \times L2) \qquad \text{(equation 20)}$$

$$\cos\left(\frac{A \cdot z}{f+z}\right) \cdot \frac{A \cdot f}{z \cdot (f+z)^2} - \frac{\sin\{A \cdot z/(f+z)\}}{z^2} = 0 \qquad \text{(equation 21)}$$

Figure 19:
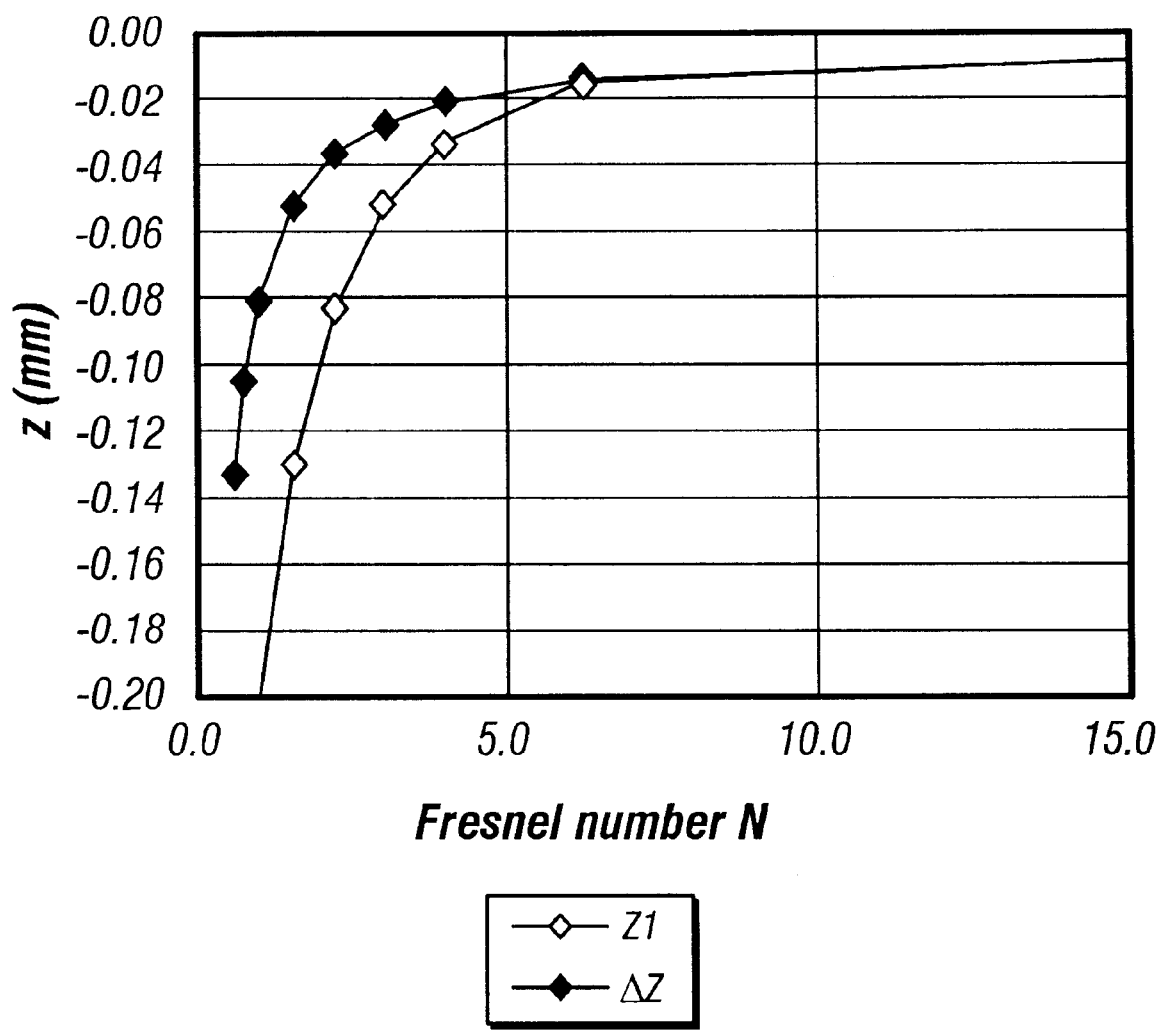
FIG. 19 is a chart showing the relationship of a Fresnel number and a shift between the geometrical optical converging point and the point in which the intensity of the converged light beam is maximum, and the relationship of a Fresnel number and the focal depth.
Figure 20:
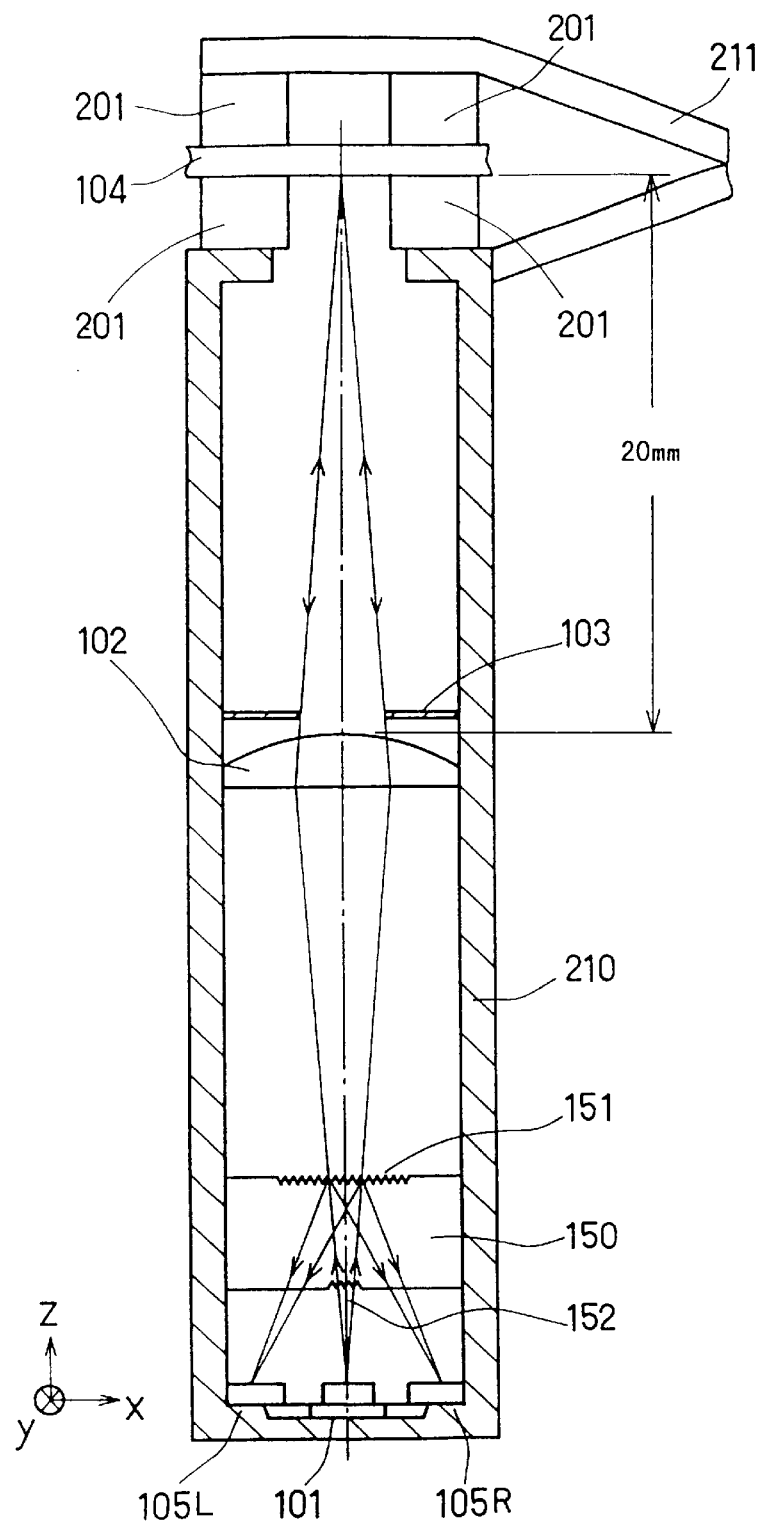
FIG. 20 is a schematic cross sectional view showing one example of an optical system of a conventional optical head device.

FIG. 19 shows the relationship of the Fresnel number N and the shift z1 between the point Q1 in which the intensity of the converged light is maximum and the geometrical optical converging point Q2, and the Fresnel number N and the focal depth Δz. Herein, the focal depth Δz is expressed by the following equation 22.

$$\Delta z = \lambda / (2\pi \times NA \times NA) \qquad \text{(equation 22)}$$

As shown in FIG. 19, when the Fresnel number N is about 10 or less, the shift z1 between the point Q1 in which the intensity of the converged light beam is maximum and the geometrical optical converging point Q2 is longer than the focal depth Δz. Furthermore, when the Fresnel number N is not more than 5, the difference between z1 and Δz is remarkably larger, thus securely obtaining the great effect by the difference of the light converging point.

As mentioned above, according to the configuration of this embodiment, the disk 104 is actually irradiated with the beam spots as expected, thus enabling the read of the track for positioning the magnetic head 201 serving as the information head device or the read of signals for recording and reproducing the information and the write of information on the disk 104. In addition, around the point Q1 in which the intensity of the converged light beam is maximum, the wave surface of the light beam is closer to flat, the light beam reflected from this point Q1 is converged to the conjugate point to the light emitting point. Therefore, according to this embodiment, it is possible to stably read the track for positioning the magnetic head 201 serving as the information head device. As a result, the optical head device having a small size and high reliability can be realized at low cost.

Furthermore, when the optical system having a small Fresnel number N is used as in this embodiment, the distance between the object point and the image point can be reduced by using the lens of the same focal length. Therefore, the device can further be miniaturized. On the contrary, when the distance between the object point and image point is the same, the focal length of the lens can be increased, so that a radius of curvature of the lens can be increased. As a result, the lens can easily be manufactured.

Moreover, in a case where the width of the opening of the aperture stop is different depending upon directions, the Fresnel number N varies in accordance with the directions, thus changing the position of the light converging point. When the Fresnel number N is small, the difference between the positions of the light converging point is increased.

Therefore, in an optical system having the Fresnel number N of about 10 or less in the direction in which the width of the opening is narrow, in order to generate the spot with little or no astigmatism, the width of the opening is required to be about the same in all the directions.

Furthermore, when the Fresnel number N is about 10, even if a aperture stop 110 having a square shape opening as shown in FIG. 4 is used, the substantially same effect as in a case where the aperture stop 103 having a circular opening shown in FIG. 2 is used can be obtained.

Moreover, in the optical head device shown in FIG. 1, by using the diffraction element 150 provided with diffraction gratings 151 and 152 on both surfaces, three beams and detecting light beams are generated. However, the configuration shown in FIG. 5 or FIG. 6 also can provide the same effect as the above. In other words, in the optical head devices shown in FIG. 5 or 6, when the Fresnel number N is small and the point in which the intensity of the converged light beam is different from the geometrical optical converging point, by arranging the disk 104 at the position of the point in which the intensity of the converged light beam is maximum, the disk 104 is irradiated with beam spots as actually expected. Thus, enabling the read of the track for positioning the magnetic head 201 serving as the information head device or the read of signals for recording and reproducing the information and the write of information on the disk 104. Hereinafter, these optical head devices will be described.

Figure 5:
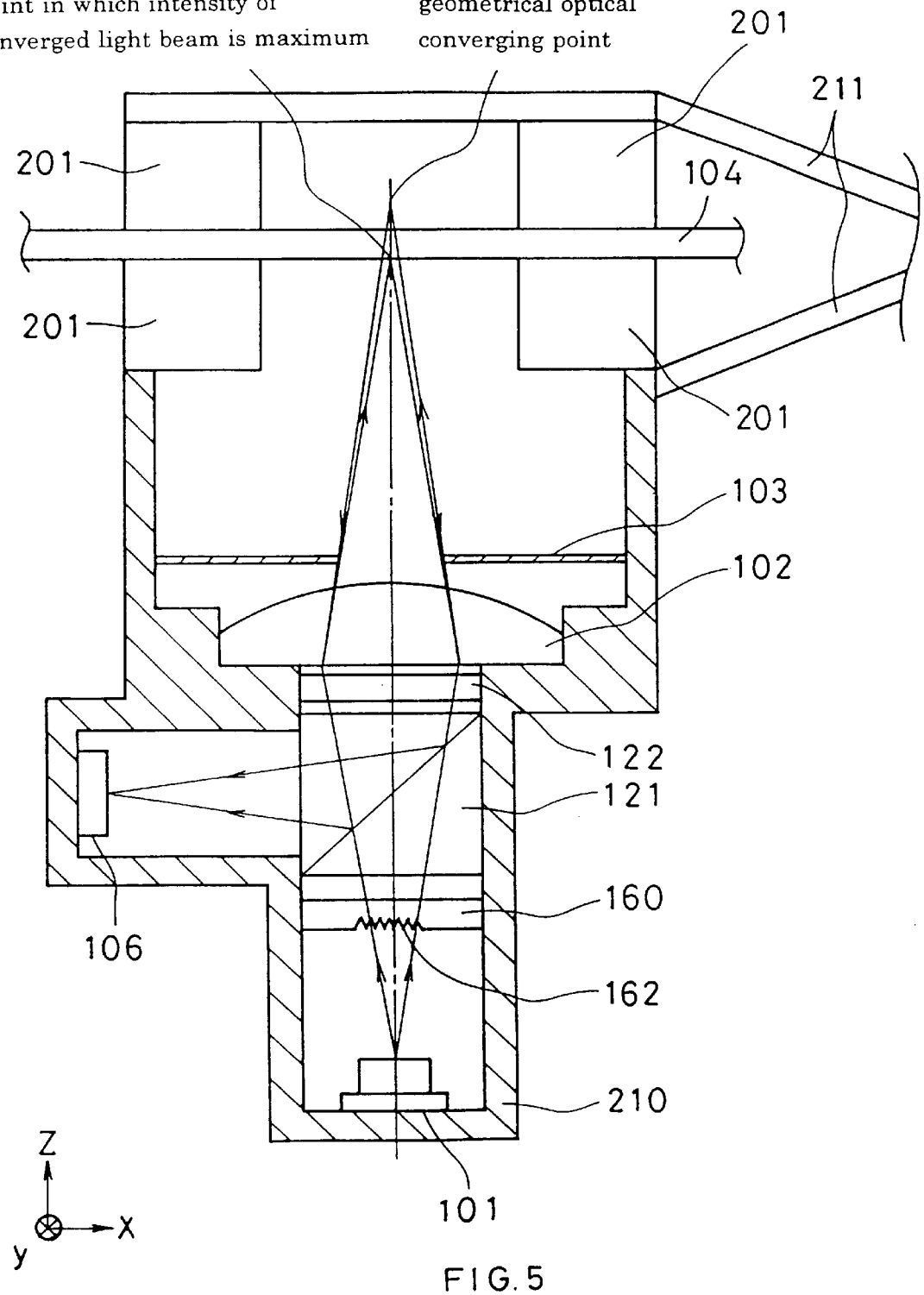
FIG. 5 is a schematic cross sectional view showing another configuration of an optical head device in a first embodiment according to the present invention.

First, the optical head device shown in FIG. 5 will be described. In an optical head device of FIG. 5, a polarization beam splitter 121 and a ¼ wavelength plate 122 are used. As shown in FIG. 5, the light beam emitted from the semiconductor laser 101 serving as the light source is divided into a main beam and two sub-beams (sub-beams are not shown) when it passes through the diffraction grating 162 provided at the side of the light source of the surface of the diffraction element 160. These beams pass through the polarization beam splitter 121. The light beam emitted from the semiconductor laser 101 is a linearly polarized light beam whose polarization direction is the direction of passing through the polarization beam splitter 121. The light beams passed through the polarization beam splitter 121 pass through the ¼ wavelength plate 122 so as to be a circularly polarized light beams. These beams are converged by the lens 102 serving as the converging optical system and irradiate the disk 104. The numerical aperture of the lens 102 is limited by the aperture stop 103. The light beams reflected and diffracted from the disk 104 pass through the aperture stop 103, the lens 102 and the ¼ wave plate again. When the light beams pass through the ¼ wavelength plate, they become linearly polarized light beams, which are different by 90° in the polarization direction from the light beam when it was emitted from the semiconductor laser 101. These light beams are reflected from the polarization beam splitter 121 and enter the photo detector 106.

The photo detector 106 consists of three detecting regions, receives the main beam and two sub-beams separately and outputs signal in accordance with the quantity of the received light.

If the optical system of FIG. 5 is used, light beams advancing from the semiconductor laser 101 to the disk 104 and light beams reflected from the disk 104 can be separated by the polarization beam splitter 121. As a result, no light beams returns to the semiconductor laser 101. Therefore, even when the distance between the object point and image point is reduced, the fluctuation of the quantity of light of the semiconductor laser 101 or noise is not generated. Thus, the effect when the device is miniaturized is enhanced.

Figure 6:
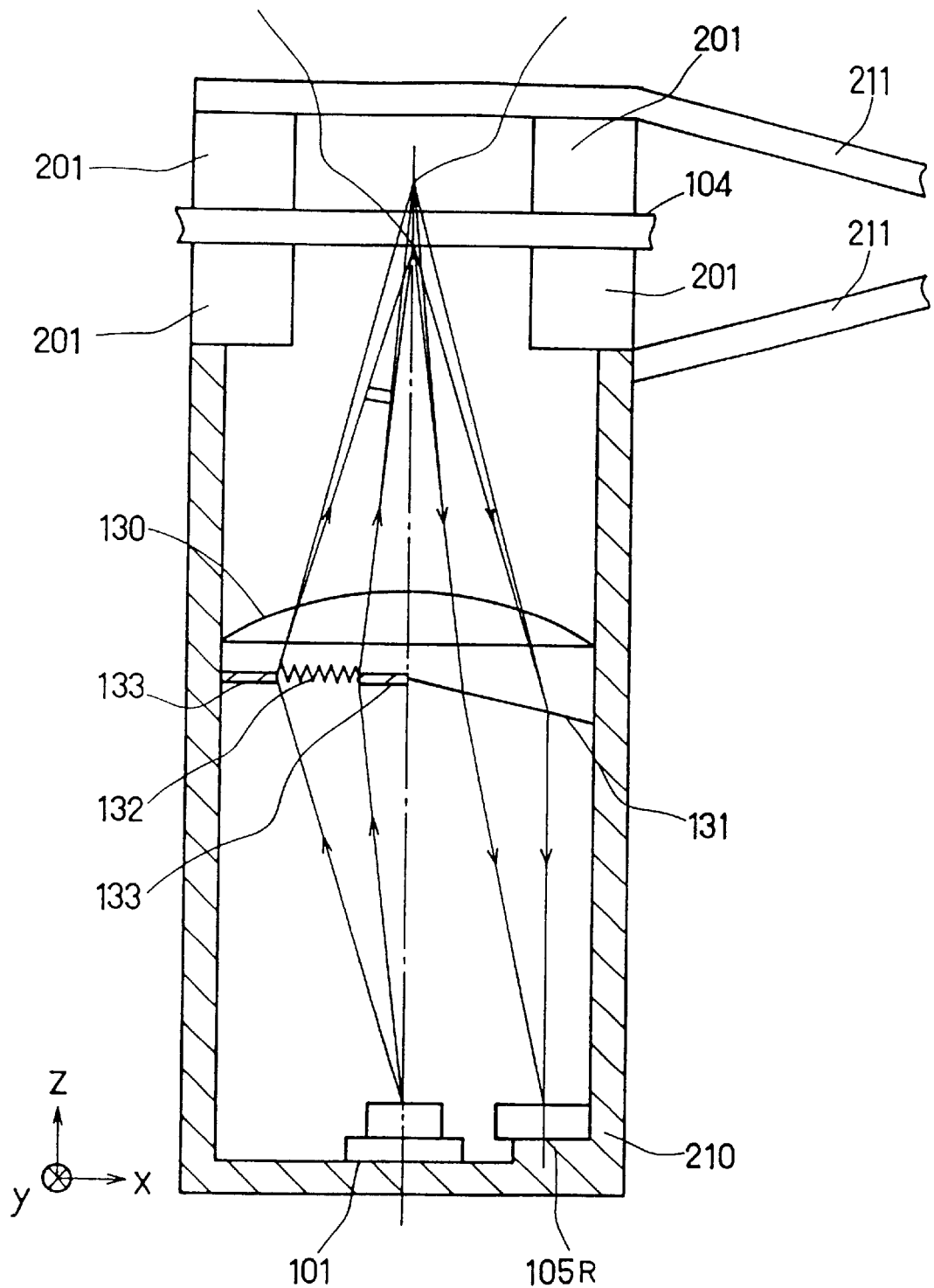
FIG. 6 is a schematic cross sectional view showing a further configuration of an optical head device in a first embodiment according to the present invention.

Next, the optical head device of FIG. 6 will be described. As shown in FIG. 6, the light beam emitted from the semiconductor laser 101 serving as the light source is divided into a main beam and two sub-beams (sub-beams are not shown) when it passes through a diffraction grating part 132 of a lens 130 having a wedge surface and serving as a converging optical system. These beams are converged by the lens surface of the lens 130 and irradiate the disk 104. The numerical aperture of the lens 102 is limited by the aperture stop 133 provided around the diffraction grating part 132. The light beams reflected and diffracted from the disk 104 pass through a wedge surface 131 provided adjacent to the aperture stop 133 and enter the photo detector 105 R provided at a different point than the light emitting point.

In the case of an optical system having a configuration shown in FIG. 6, similar to the case of the optical system shown in FIG. 5, no light beams return to the semiconductor laser 101. Namely, light beams advancing from the semiconductor laser 101 to the disk 104 and light beams reflected from the disk 104 can be separated by the lens 130 having a wedge surface 131. Therefore, even when the distance between the object point and image point is reduced, the fluctuation of the quantity of light of the semiconductor laser 101 or noise is not generated. Thus, also in this case, the effect when the device is miniaturized is enhanced.

In this embodiment, a plano-convex lens is used as the converging optical system. However, when the converging optical system consisting of a plurality of lenses are used, or when the converging optical system made of lens other than the plano-convex lens is used, the effect where the device is miniaturized by using this embodiment is not deteriorated.

Furthermore, the aperture stop may be arranged at the side of the disk of the lens serving as the converging optical system (FIGS. 1 and 5) or may be arranged at the side of the light source of the lens (FIG. 6). When the position of the aperture stop is changed, the radius a of the opening used for calculating the Fresnel number $N=(a \times a)/(\lambda \times L2)$ is the radius obtained when the opening of the aperture stop is projected on the principal surface at the side of the disk of the lens.

Figure 7:
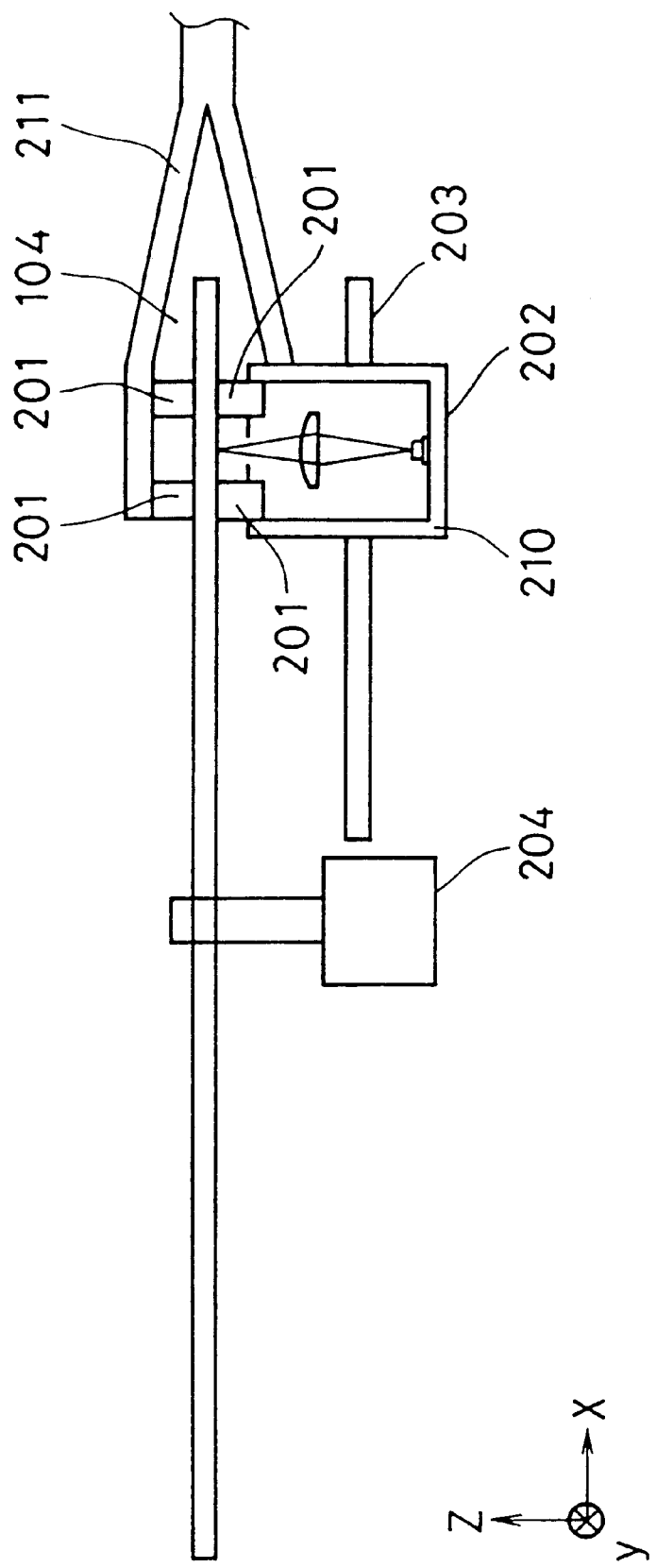
FIG. 7 is a schematic cross sectional view showing a configuration of an information recording and reproducing apparatus in a first embodiment according to the present invention.

FIG. 7 shows the outline of the magnetic disk drive serving as the information recording and reproducing apparatus. As shown in FIG. 7, in this magnetic disk drive, an optical head device 202 having the above-mentioned configuration in this embodiment is used. The disk 104 is sandwiched by the magnetic heads 201 serving as the information head device attached to an arm 211, and thereby the position of the disk 104 in the direction of the z-axis is regulated. Each member of the optical system and the magnetic heads 201 are fixed in a frame 210. The frame 210 is attached to a moving means 203 serving as a transfer device, and thereby the optical head device 202 and the magnetic heads 201 can be transferred from the internal circumference to the external circumference in the direction of the radius of the disk 104. Furthermore, the disk 104 is rotated by a motor 204 serving as a rotating means. According to these mechanisms, the recording and reproducing information is conducted all over the disk 104.

Since the optical head device 202 having a configuration of this embodiment is used in this magnetic disk drive serving as the information recording and reproducing apparatus, the size of the information recording and reproducing apparatus can be miniaturized. Furthermore, the apparatus is less susceptible to environmental changes such as change of temperature or vibration, etc. Thus, a stable recording and reproducing of information is possible.

Second Embodiment

Next, a second embodiment of the present invention will be described with reference to FIGS. 1, 3, and 8 to 13.

The second embodiment uses astigmatism generated by the difference between the positions of the light converging point due to the difference of the Fresnel number.

Figure 8:
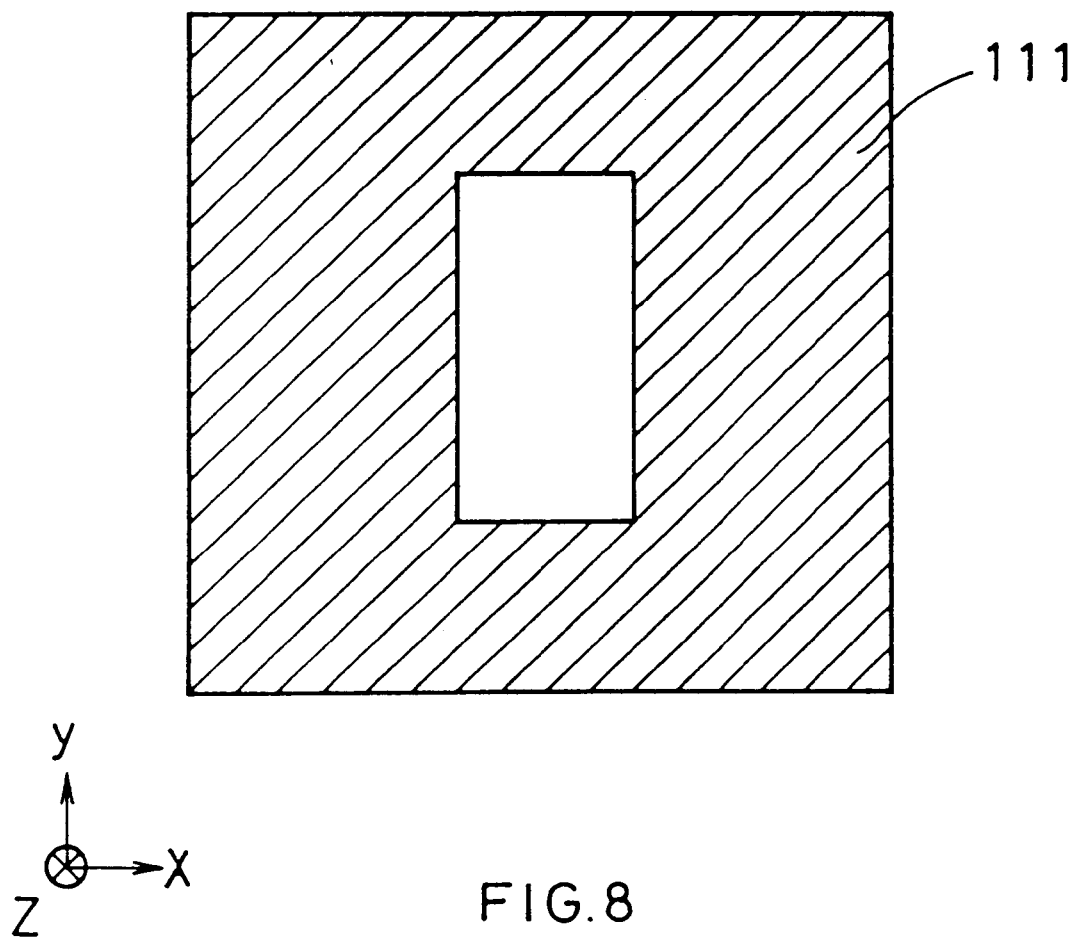
FIG. 8 is a plan view showing one example of an aperture stop used for an optical head device in a second embodiment according to the present invention.
Figure 9:
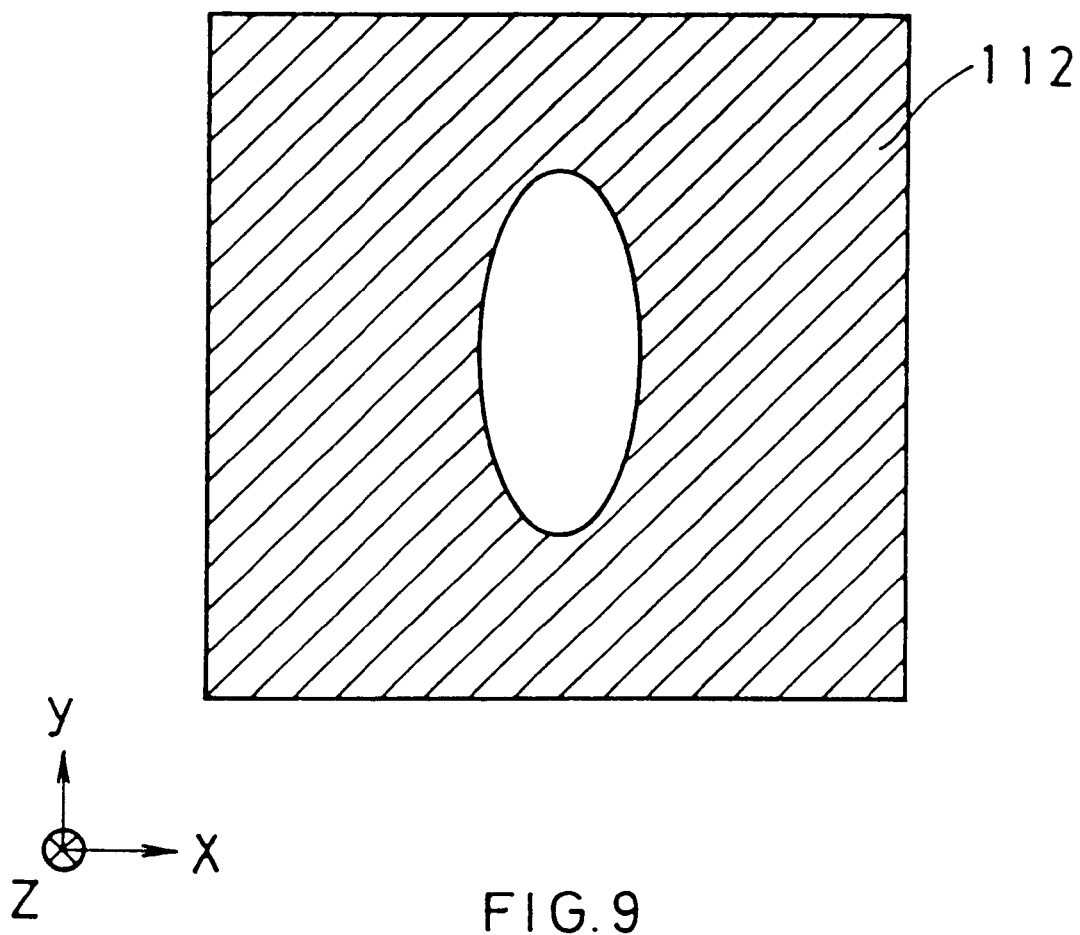
FIG. 9 is a plan view showing another example of an aperture stop used for an optical head device in a second embodiment according to the present invention.
Figure 10:
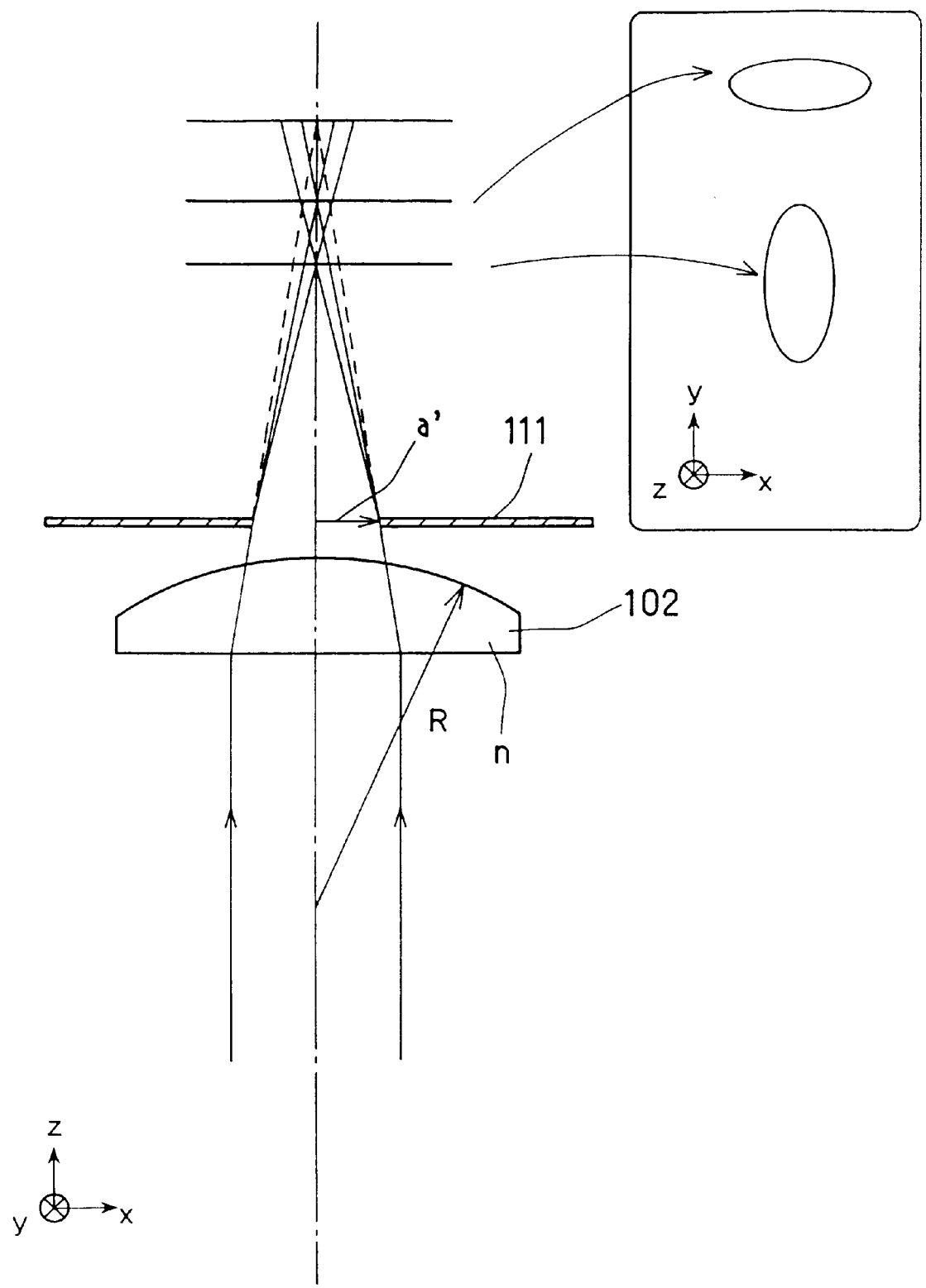
FIG. 10 is a conceptional view showing an optical converging point and a converging spot when astigmatism occurs in a second embodiment according to the present invention.

The astigmatism can be generated on the beam spot irradiated to the disk 104 by using an aperture stop 111 having a rectangular opening shown in FIG. 8 or a aperture stop 112 having an elliptical opening shown in FIG. 9 in place of the aperture stop 103 having a circular opening in the optical head device of FIG. 1.

In the aperture stop 111 having a rectangular opening shown in FIG. 8, the width in the direction of x-axis of the opneing in which the aperture stop 111 is projected on the principal plane of the disk side of the lens 102 is 160 $\mu$m and the width in the direction of y-axis of the opening is 320 $\mu$m. When the distance L2 between the geometrical optical converging point Q2 and the second principal point H2 of the lens 102 is 2 mm and the wavelength of the light beam emitted from the semiconductor laser 101 is 800 nm, the Fresnel number Nx in the direction of the x-axis is 4 and that in the direction of the y-axis is 16. Therefore, the astigmatism shown in FIG. 10 can be generated on the beam spot converged by the lens 102 and irradiating the disk 104. Herein, the point in which the half-width of the spot is minimum in the direction of x-axis having a small Fresnel number is closer to the lens 102 and the point in which the half-width of the spot is minimum in the direction of y-axis having a large Fresnel number is distant from the lens 102. In this case, the positional difference (astigmatic difference) between the point in which the half-width of the spot is minimum in the direction of x-axis and the point in which the half-width of the spot is minimum in the direction of y-axis is about 120 $\mu$m.

Also in the case of using the aperture stop 112 having an elliptical opening shown in FIG. 9, as in the case of using the aperture stop 111 having a rectangular opening shown in FIG. 8, beam spot having the astigmatism can be generated.

Figure 11:
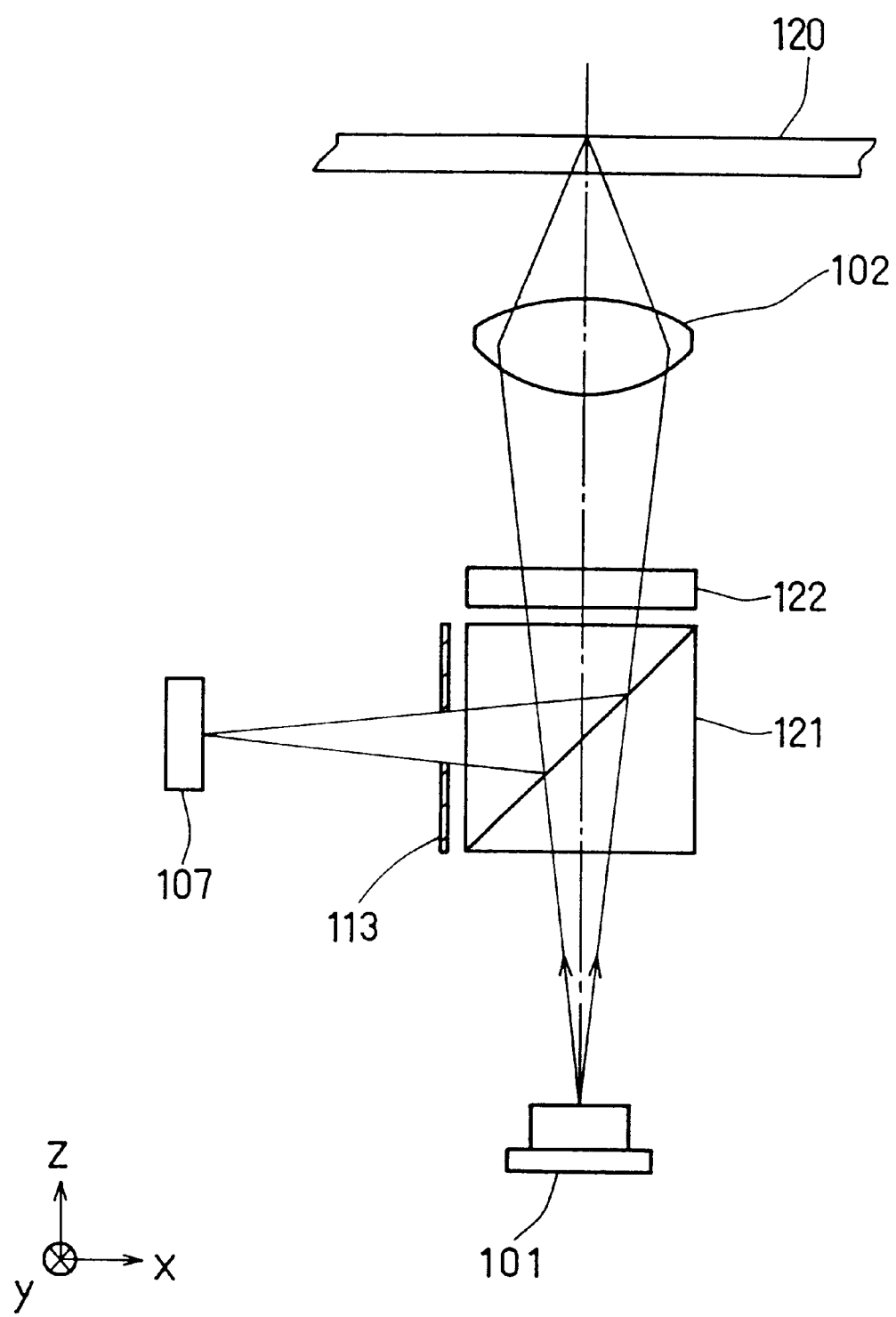
FIG. 11 is a schematic cross sectional view showing a configuration of an optical head device in a second embodiment according to the present invention.

The example of the case where a beam spot having astigmatism is used for the focus detection will be described with reference to the FIG. 11. As shown in FIG. 11, the linearly polarized light beam emitted from the semiconductor laser 101 serving as light source passes through the polarization beam splitter 121 and then becomes the circularly polarized light beams by the ¼ wavelength plate 122. This light beam is converged by the lens 102 serving as the converging optical system and irradiates the optical disk 120 serving as the information recording medium. The light beam reflected and diffracted from the optical disk 120 passes through the lens 102 and ¼ wavelength plate 122 again. When the light beam pass through the ¼ wavelength plate, it becomes a linearly polarized light beam, which is different by 90° in the polarization direction from the light beam when it was emitted from the semiconductor laser 101. This light beam is reflected from the polarization beam splitter 121 and passes through the aperture stop 113 and then enters the photo detector 107. The photo detector 107 consists of a plurality of photo receiving regions and outputs the signal in accordance with the quantity of the received light.

Figure 12:
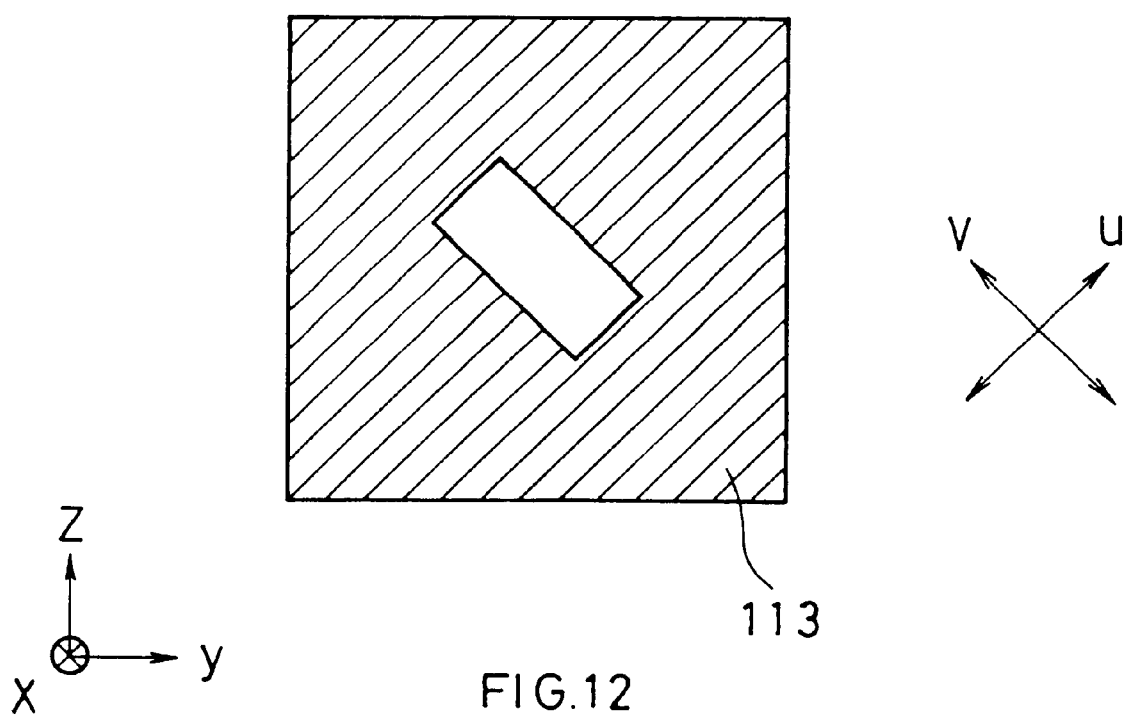
FIG. 12 is a plan view showing one example of an aperture stop used for an optical head device in a second embodiment according to the present invention.

FIG. 12 shows the shape of the aperture stop 113. As shown in FIG. 12, a rectangular opening that is declined by 45° with respect to the −y direction is provided. By this aperture stop 113, the optical system having a small Fresnel number in the u direction and a large Fresnel number in the v direction is realized. As a result, astigmatism can be provided to the light entering the photo detector 107 so that the point in which the half-width of the spot is minimum in the u direction having a small Fresnel number is closer to the aperture stop 113 and the point in which the half-width of the spot is minimum in the v direction having a large Fresnel number is distant from the aperture stop 113. The photo detector 107 is arranged between these two points and adjusted to have a circular light converging spot on the photo detector 107 when the light beams having passed through the lens 102 are converged on the information surface of the optical disk 120.

In this embodiment, the astigmatism is generated by using the difference of the Fresnel number in the path from the light converging lens 102 to the photo detector 107. When the Fresnel number (minimum Fresnel number $N_{min}$) in the u direction is 10 or less, the difference in the converging position is significant, thus generating the substantially effective astigmatism. Herein, the minimum Fresnel number $N_{min}$ is expressed by the following equation 23.

$$N_{min}=(a1 \cdot a1)/(\lambda \cdot L2) \quad \text{(equation 23)}$$

wherein a1 denotes the half value of the width of the opening of the aperture stop 113 in the u direction.

Figure 13:
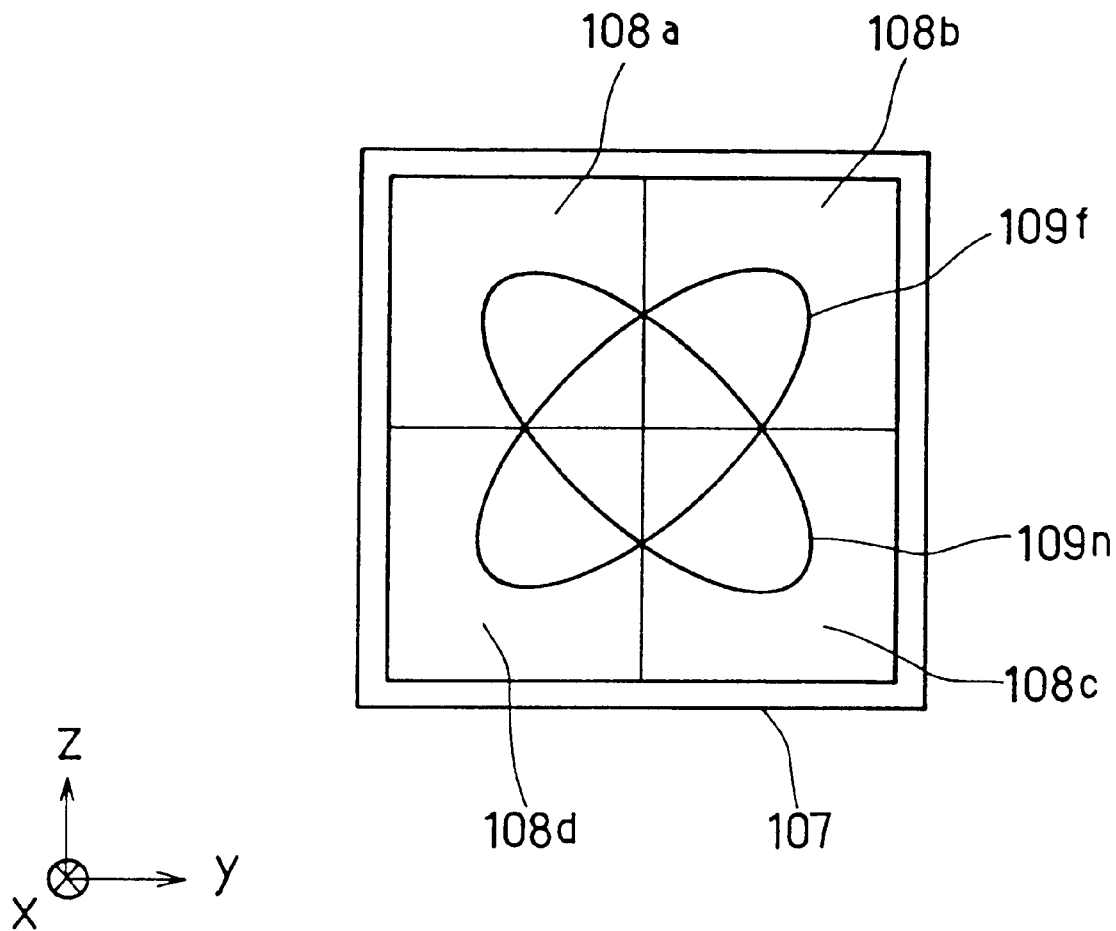
FIG. 13 is an elevation view showing one example of a photo-detecting region of an optical head device and a pattern of a cross section of a light beam in a second embodiment according to the present invention.

FIG. 13 shows the photo receiving regions 108a to 108d of the photo detector 107 and pattern examples 109f and 109n of the cross section of the light beam. A focus error signal can be obtained from the difference between the sum of signals detected by the photo receiving region 108a and signals detected by the photo receiving region 108c and the sum of signals detected by the photo receiving region 108b and signals detected by the photo receiving region 108d. When the optical disk 120 is located at the distant from the lens 102, a cross section of the light beam on the photo detector 107 has a shape of 109f. In the meanwhile, when the optical disk 120 approaches to the lens 102, a cross section of the light beam on the photo detector 107 has a shape of 109n. Therefore, when the focus error signal is generated like the above and servo-control is applied by using the focus error signal, the light converging point can be maintained on the optical disk 120 in accordance with surface blurring, etc. of the optical disk. In addition, a tracking signal can be obtained by a phase contrast method.

According to this embodiment, without adding a new glass component, beam spot having astigmatism can easily be generated. Furthermore, unlike an optical system having a half mirror made of parallel flat glass, since transmitted light can be used for a light advancing from the semiconductor laser 101 to the optical disk 120, the component having less surface accuracy can be used. Therefore, an optical system can be composed by cheap components. Furthermore, since coma does not occur as in the case where the parallel-plate glass is inclined to use, only astigmatism can be provided.

Moreover, in this embodiment, the case in which the beam spot having astigmatism is used for focus detection is described. However, this embodiment generally describes the method for generating astigmatism, and so applicability is not limited to the focus detection alone.
Third Embodiment Next, a third embodiment of the present invention will be described with reference to FIGS. 14 and 15.

In this embodiment, an example of an optical system capable of obtaining a light converging spot having a little aberration by correcting the astigmatism of the light beam having the astigmatism will be described.

The light emitting position of the semiconductor laser varies in the direction parallel to an active layer and the direction perpendicular to the active layer. In other words, the semiconductor laser has an astigmatic difference. This astigmatic difference is shorten by longitudinal magnification of the optical system when the light beam is converged again by the lens 102. There arises a problem when the maximum permissible aberration with respect to the light converging spot is small.

Figures 14A, 14B, 14C:
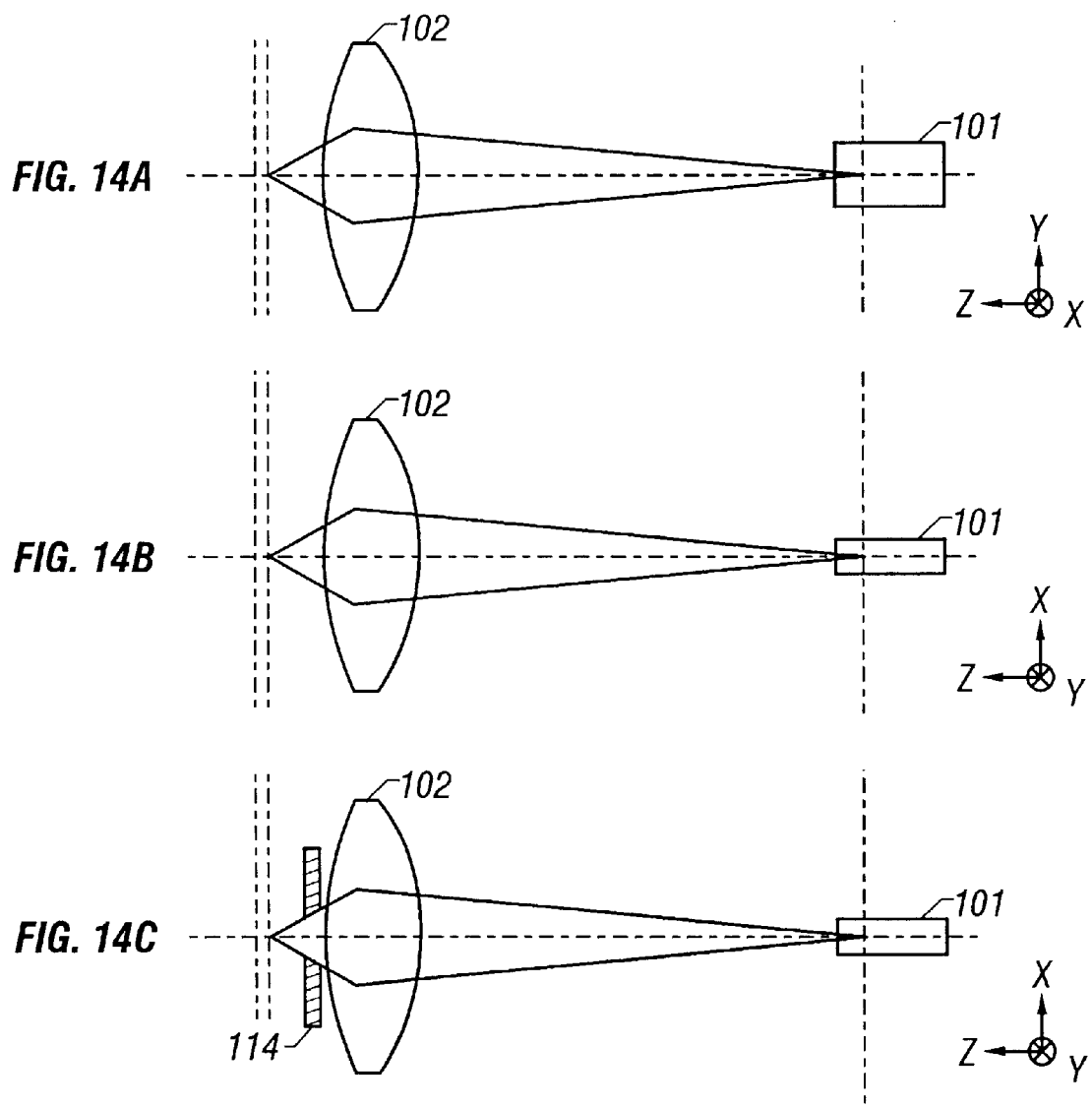
FIG. 14 is a schematic cross sectional view showing one example of an optical system of an optical head device in a third embodiment of the present invention.

FIGS. 14(a) and (b) show the effect of the astigmatic difference. Herein, the active layer of the semiconductor laser 101 is assumed to be in a y-z plane. FIG. 14(a) shows the optical system seen from the direction perpendicular to the y-z plane, and FIG. 14(b) shows the optical system seen from the direction perpendicular to a z-x plane crossing the y-z plane at right angles. As shown in FIG. 14(a), in the y-z plane including the active layer, the light emitting point is present inside of the active layer rather than the end portion of semiconductor laser 101. On the other hand, as shown in FIG. 14(b), in the z-x plane, the confinement of light reaches to the end portion of the semiconductor laser 101, so that the light emitting point is at the end portion of the semiconductor laser 101. Therefore, beam spot converged by the lens 102 is located closer to the lens 102 in FIG. 14(a), and distant from the lens 102 in FIG. 14(b).

Figure 15:
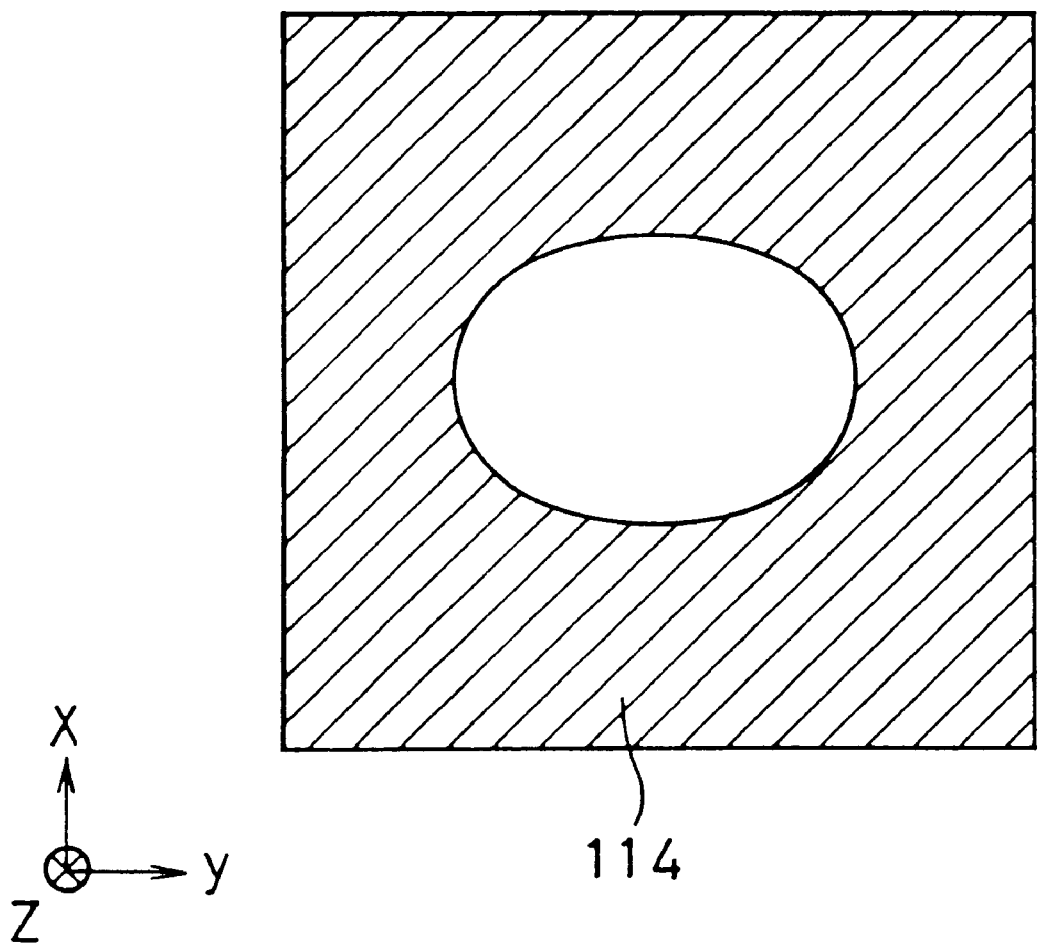
FIG. 15 is a plan view showing one example of an aperture stop used for an optical head device in a third embodiment according to the present invention.

As shown in FIG. 14(c), in this embodiment, an aperture stop 114 is inserted into the light beam converged by the lines 102. As shown in FIG. 15, the aperture stop 114 has an elliptic opening having a slightly narrow width in the direction of x-axis. By using the aperture stop 114, the Fresnel number in the direction of x-axis is made to be smaller than the Fresnel number in the direction of y-axis, so that the light converging point in the direction of x-axis can be approached to the lens 102. As a result, the light converging points in the x direction and y direction can be accorded. The aperture stop 114 having an elliptic opening having a slightly narrow width in the x direction is inserted into the light beam converged by the lens 102, so that the astigmatism generated by the astigmatic difference of the semiconductor laser 101 can be reduced.

In this embodiment, by the astigmatism generated by the difference of the Fresnel number in the path from the semiconductor laser 101 to the light converging lens 102, the astigmatism of the light beam emitted from the semiconductor laser 101 is reduced. Also in this case, when the Fresnel number in the direction of x-axis (minimum Fresnel number $N_{min}$) is 10 or less, the difference of the light converging points is significant. Thus, the substantially effective effect due to the reduction of the astigmatism can be obtained.

Also in this case, as in the second embodiment, since coma does not occur as in the case where parallel-plate glass is inclined and used, the astigmatism of the semiconductor laser 101 or the optical system can be corrected without deteriorating the wave surface. Therefore, a high quality wave surface having a little aberration can be obtained.

According to this embodiment, astigmatism generated by the astigmatic difference, etc. of the semiconductor laser can be eliminated by using a simple configuration. Consequently, an optical head device having a high performance and high quality can be realized at low cost.

Moreover, in this embodiment, the example in which the astigmatism generated by the astigmatic difference of the semiconductor laser 101 is described. However, this embodiment is not limited to this case alone. For example, by using the configuration of this embodiment, astigmatism generated by optical components can be corrected.

Fourth Embodiment

Next, a fourth embodiment of the present invention will be described with reference to FIGS. 15 and 16.

In this embodiment, an example of an optical system capable of obtaining a light beam having the light surface having a little aberration by correcting the astigmatism of the light beam having the astigmatism will be described.

Figure 16:
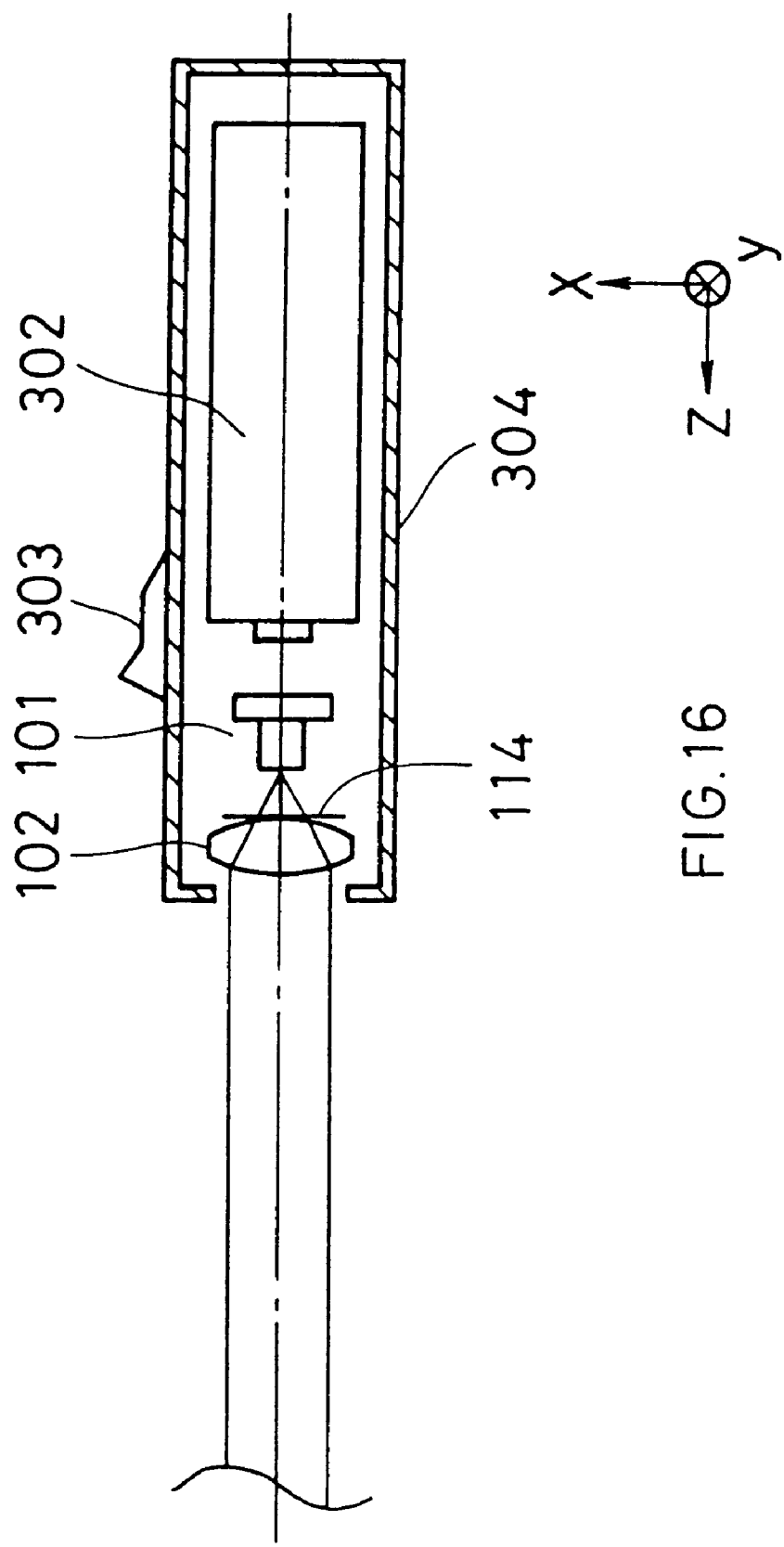
FIG. 16 is a schematic cross sectional view showing one example of an optical system in a fourth embodiment according to the present invention.

FIG. 16 shows a configuration of a laser pointer as an example. Also in this embodiment, the astigmatism generated by the astigmatic difference of the semiconductor laser 101 is corrected. In FIG. 16, a numeral reference 302 denotes a battery for emitting a light to the semiconductor 101. The battery 302, semiconductor laser 101 and lens 102 are housed in a frame 301. Furthermore, the frame 301 is provided with a switch 303 on the external surface. By the switch 303, the semiconductor laser 101 can be in a state of on/off. Furthermore, the aperture stop 114 is arranged on the side of the semiconductor laser 101 of the lens 102.

As shown in FIG. 16, the light beam emitted from the semiconductor laser 101 serving as the light source passes through the aperture stop 114, becomes a parallel light beam, and then emits to the outside the frame 301. As shown in FIG. 15, the aperture stop 114 has an elliptic opening whose width in the direction of the x-axis is slightly narrow. The semiconductor laser 101 is arranged in the direction in which the active layer is located in a y-z plane. Furthermore, the astigmatism generated by the astigmatic difference of the semiconductor laser 101 is cancelled and reduced by the astigmatism generated by the aperture stop 114 (namely, astigmatism generated by the difference in the Fresnel number in the path advancing from the semiconductor laser 101 to the converging lens 102) by the same principle as the third embodiment.

Therefore, the light beam emitted to the outside of the frame 301 becomes a plane wave. Even if the light beam advances in a long path, the cross sectional shape of the light beam can be maintained as a circle. Furthermore, since the lens 102 can be brought closer to the semiconductor laser 101, the device can be miniaturized. Furthermore, the cross sectional shape of the light beam can be reduced, and thus a bright light beam can be obtained.

Fifth Embodiment

Next, a fifth embodiment of the present invention will be described with reference to FIGS. 17 and 18.

In the fifth embodiment, the case in which a focus control is conducted in an optical disk device, etc. will be described.

Figure 17:
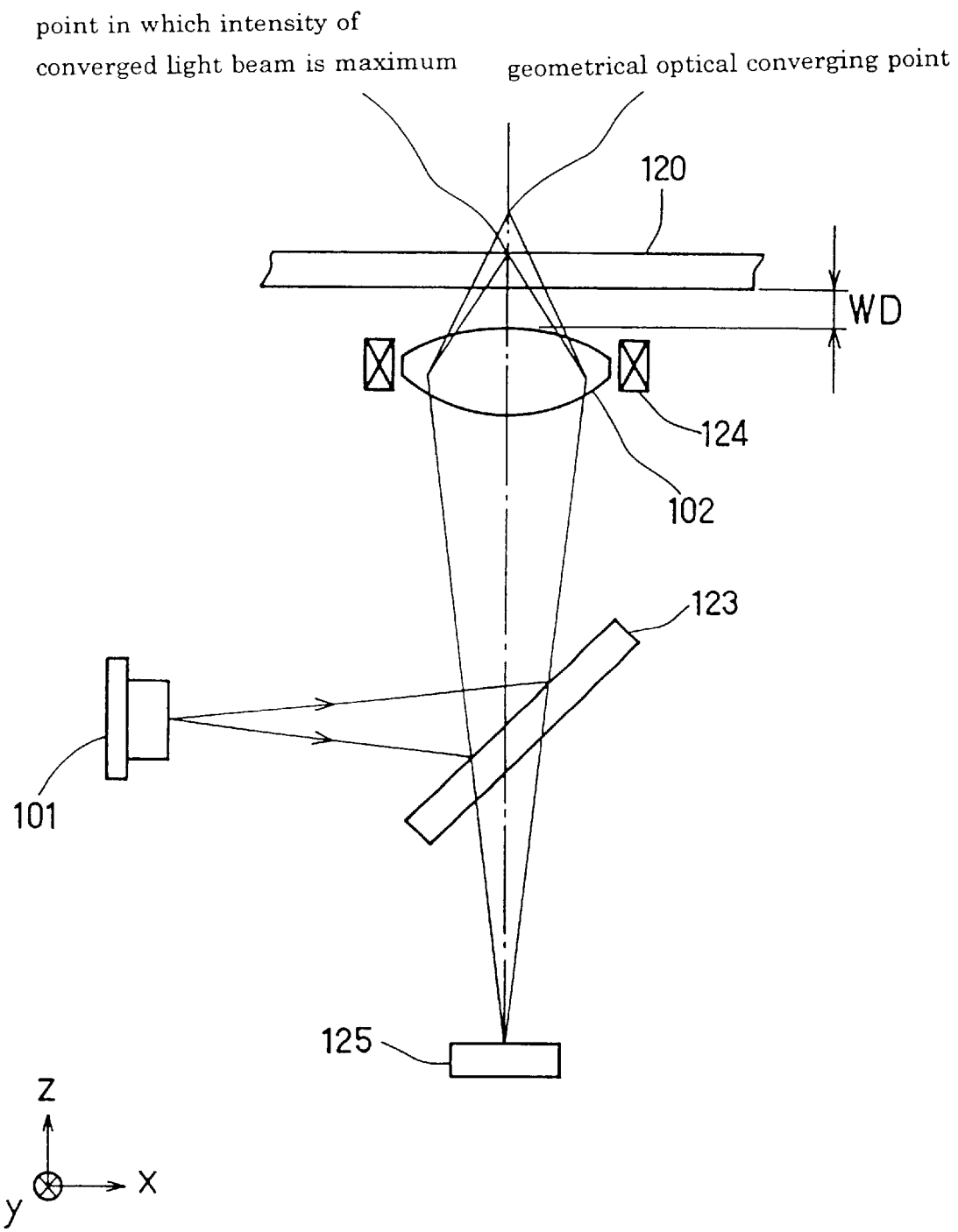
FIG. 17 is a schematic cross sectional view showing one example of an optical system of an optical head device in a fifth embodiment according to the present invention.

FIG. 17 shows one example of the optical head device in this embodiment. As shown in FIG. 17, the light beam emitted from the semiconductor laser 101 serving as the light source is reflected from a half mirror 123, is converged by the lens 102 serving as the converging optical system, and then irradiates the optical disk 120 serving as the information recording medium. The light beam reflected and diffracted from the optical disk 120 is converged by the lens 102 again and passes through the half mirror 123. The light beam converged by the lens 102 is provided with astigmatism when it passes through the half mirror 123, and then received by the photo detector 125. The photo detector 125 outputs electrical signals in accordance with the quantity of the received light.

Although detailed explanation is omitted herein, the photo detector 125 consists of a plurality of detecting regions, obtains the focus error signals by an astigmatism method and obtains the tracking error signals by a phase contrast method. An actuator 124 serving as the lens holding means moves the lens 102 in the focus direction and in the tracking direction in accordance with the focus error signal and tracking error signals.

In general, the actuator 124 serving as the lens holding means can optionally vary the distance between the lens 102 and optical disk 120. However, when the focus control is conducted, the distance between the lens 102 and the optical disk 120 is substantially maintained constant. In the focus control, the lens 102 is controlled so that a point in which the intensity of the converged light beam is maximum comes to the optical disk 120. Therefore, also in this case, the optical disk 120 is arranged at the point in which the intensity of the light beams is maximum rather than the geometrical optical converging point.

When the Fresnel number N is small, the point in which the intensity of the converged light is maximum is located closer to the lens 102 than the geometrical optical converging point. Therefore, a working distance (WD in FIG. 17) that is a distance from the surface of the optical disk 120 to the top of the lens 120 becomes small as compared with the case where the optical system is designed by using geometrical optics. When the working distance is small, due to the surface blurring, etc. when the optical disk 120 is rotated, the optical disk 120 and lens 102 collide with each other, which may damage the lens 102 or optical disk 120.

In order to secure a predetermined working distance when the Fresnel number N is small (N is 10 or less), as compared with the case where the Fresnel number N is large, it is necessary to design the focal length longer. In other words, if the lens 102 is designed to have the longer focal length, the geometrical optical converging point can be located more distant from the lens 102. Furthermore, the point in which the intensity of the light beam is maximum can be located at a predetermined place by design. Thus, since sufficient working distance can be secured, the optical disk 120 and the lens 102 do not collide with each other. Consequently, the lens 102 or optical disk 120 may not be damaged.

Furthermore, if the Fresnel number N is small, the distance between the object point and the image point can be reduced by using a lens having the same focal length. Therefore, the device can be miniaturized. On the contrary, if the distance between the object point and the image point is the same, the focal length of the lens can be increased, so that the radius of curvature of the lens can be increased. As a result, the lens can easily be manufactured.

Figure 18:
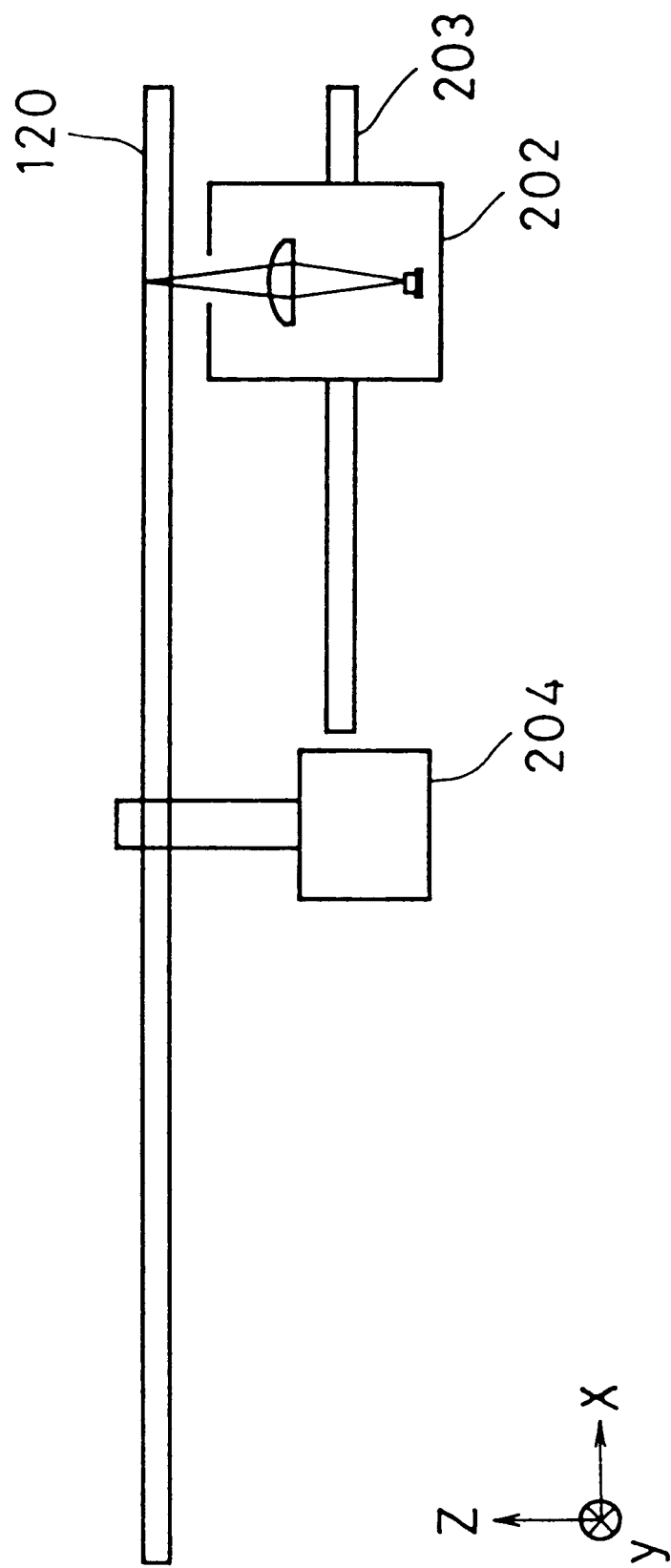
FIG. 18 is a schematic cross sectional view showing one example of an information recording and reproducing apparatus in a fifth embodiment according to the present invention.

FIG. 18 shows a schematic view of the optical disk drive serving as the information recording and reproducing apparatus using the optical head device of this embodiment. In FIG. 18, the optical head device 202 also serves as an information head device recording or reproducing information. Therefore, the magnetic head, etc. is not necessary, thus realizing recording and reproducing information by using a simpler configuration. The optical head device 202 can be moved from the internal circumference to the external circumference in the direction of the radius of the disk 120 by the moving means 203 serving as a moving device of an optical head device. Furthermore, the disk 120 is rotated by means of a motor 204 serving as rotating means. According to these mechanisms, the recording and reproducing information is conducted all over the disk 104.

Finally, it is understood that the invention may be embodied in other specific forms without departing from the spirit or essential characteristics thereof. The embodiments disclosed in this application are to be considered in all respects

What is claimed is:

1. An optical head device comprising:

a light source emitting a light beam;

a converging optical system converging said light beam emitted from said light source to an information recording medium on which information is recorded; and a holding means maintaining a constant distance between said information recording medium and said converging optical system, and satisfying the following equations 1, 2, 3, and 4:

$$L2 = f \times L1/(L1-f) \quad \text{(equation 1)}$$

$$h < L2 \quad \text{(equation 2)}$$

$$\Delta z = \lambda/(2\pi \times NA \times NA) \quad \text{(equation 3)}$$

$$h < L2 - \Delta z \quad \text{(equation 4)}$$

wherein f denotes a focal length of said converging optical system;

L1 denotes a distance between said light source and a first principal point located on a light source side of said converging optical system;

h denotes a distance between a second principal point located on an information recording medium side of said converging optical system and said information recording medium held by said holding means;

$\lambda$ denotes a wavelength of said light beam emitted from said light source; and NA denotes a numerical aperture on the information recording medium side of said converging optical system.

2. An optical head device comprising:

a light source emitting a light beam;

a converging optical system converging said light beam emitted from said light source to an information recording medium on which information is recorded, said converging optical system comprising an aperture stop determining numerical aperture, and said aperture stop having a circular opening; and a holding means maintaining a constant distance between said information recording medium and said converging optical system, and satisfying the following equations 1 and 2:

$$L2 = f \times L1/(L1-f) \quad \text{(equation 1)}$$

$$h < L2 \quad \text{(equation 2)}$$

wherein f denotes a focal length of said converging optical system;

L1 denotes a distance between said light source and a first principal point located on a light source side of said converging optical system;

h denotes a distance between a second principal point located on the information recording medium side of said converging optical system and said information recording medium held by said holding means, and a Fresnel number N defined by the following equation 5 is 10 or loss:

$$N = (a \times a)/(\lambda \times L2) \quad \text{(equation 5)}$$

wherein a denotes a radius of an opening of a projected aperture stop on a principle plane on an information recording medium side of said converging optical system and $\lambda$ denotes a wavelength of said light beam emitted from said light source, and wherein said principal plane is a plane containing said second principal point and is perpendicular to an optical axis.

3. An optical head device comprising:

a light source emitting a light beam;

a converging optical system converging said light beam emitted from said light source to an information recording medium on which information is recorded, said converging optical system comprising an aperture stop determining numerical aperture, and said aperture stop having a square opening; and a holding means maintaining a constant distance between said information recording medium and said converging optical system, and satisfying the following equations 1 and 2:

$$L2 = f \times L1/(L1-f) \quad \text{(equation 1)}$$

$$h < L2 \quad \text{(equation 2)}$$

wherein f denotes a focal length of said converging optical system;

L1 denotes a distance between said light source and a first principal point located on the light source side of said converging optical system;

h denotes a distance between a second principal point located on an information recording medium side of said converging optical system and said information recording medium held by said holding means, and a Fresnel number N defined by the following equation 5 is 10 or less:

$$N = (a \times a)/(\lambda \times L2) \quad \text{(equation 5)}$$

wherein a denotes one side of an opening of the projected aperture stop on a principal plane on the information recording medium side of said converging optical system and $\lambda$ denotes a wavelength of said light beam emitted from said light source, and wherein said principal plane is a plane containing said second principal point and is perpendicular to an optical axis.

4. An optical head device comprising:

a light source emitting a light beam;

a converging optical system converging said light beam emitted from said light source to an information recording medium on which information is recorded, said converting optical system comprising an aperture stop determining numerical aperture, and said aperture stop having an opening with different width depending upon directions; and a holding means maintaining a constant distance between said information recording medium and said converging optical system, and satisfying the following equations 1 and 2:

$$L2 = f \times L1/(L1-f) \quad \text{(equation 1)}$$

$$h < L2 \quad \text{(equation 2)}$$

wherein f denotes a focal length of said converging optical system;

L1 denotes a distance between said light source and a first principal point located on the light source side of said converging optical system;

h denotes a distance between a second principal point located on an information recording medium side of said converging optical system and said information recording medium is held by said holding means, and a minimum Fresnel number $N_{min}$ defined by the following equation 6 is 10 or less:

$$N_{min} = (a1 \times a1)/(\lambda \times L2) \quad \text{(equation 6)}$$

wherein a1 denotes a half value of a minimum width of an opening of the projected aperture stop on a principal plane on the information recording medium side of said converging optical system and λ denotes a wavelength of said light beam emitted from said light source, and wherein said principal plane is a plane containing said second principal point and is perpendicular to an optical axis.

5. An optical system comprising a light source emitting a light beam, a converging optical system converging said light beam emitted from said light source and an aperture stop determining a numerical aperture of said converging optical system, wherein said aperture stop has an opening having a different width depending upon directions, a minimum Fresnel number $N_{min}$, defined by the following equations 7 and 8 is 10 or less:

$$L2 = f \times L1/(L1-f) \quad \text{(equation 7)}$$

$$N_{min} = (a1 \cdot a1)/(\lambda \cdot L2) \quad \text{(equation 8)}$$

wherein f denotes a focal length of said converging optical system, L1 denotes a distance between said light source and a first principal point located on the light source side of said converging optical system, a1 denotes a half value of a minimum width of an opening of the projected aperture stop on a principal plane of an information recording medium side of said converging optical system and λ denotes a wavelength of said light beam emitted from said light source, and wherein said principal plane is a plane containing a second principal point located on the information recording medium side of the converging optical system and is perpendicular to an optical axis.

6. The optical head device according to claim 1, wherein said converging optical system comprises an aperture stop determining the numerical aperture, and said aperture stop has a circular opening.

7. The optical head device according to claim 6, wherein a Fresnel number N, defined by the following equation 5, is 10 or less:

$$N = (a \times a)/(\lambda \times L2) \quad \text{(equation 5)}$$

wherein a denotes a radius of an opening of the projected aperture stop on a principal plane on the information recording medium side of said converging optical system and λ denotes a wavelength of said light beam emitted from said light source, and wherein said principal plane is a plane containing said second principal point and is perpendicular to an optical axis.

8. The optical head device according to claim 1, wherein said converging optical system comprises an aperture stop for determining the numerical aperture, and said aperture stop has a square opening.

9. The optical head device according to claim 1, wherein said converging optical system comprises an aperture stop for determining the numerical aperture, and said aperture stop has an opening having a different width depending on directions.

10. The optical head device according to claim 9, wherein a minimum Fresnel number $N_{min}$, defined by the following equation 6, is 10 or less:

$$N_{min} = (a1 \times a1)/(\lambda \cdot L2) \quad \text{(equation 6)}$$

wherein a1 denotes a half value of a minimum width of an opening of the projected aperture stop on a principal plane of said information reporting medium side of said converging optical system and λ denotes a wavelength of said light beam emitted from said light source, and wherein said principal plane is a plane containing said second principal point and is perpendicular to an optical axis.

11. An information recording and reproducing apparatus comprising an information head device recording information on an information recording medium or reproducing the information recorded on said information recording medium, an optical head device positioning said information head device, a moving means relatively moving the position of said information head device and said information recording medium, wherein an optical head device according to claim 1 is used as said optical head device.

12. An information recording and reproducing apparatus comprising an information head device recording information on an information recording medium or reproducing the information recorded on said information recording medium, an optical head device positioning said information head device, a moving means relatively moving the position of said information head device and said information recording medium, wherein an optical head device according to claim 2 is used as said optical head device.

13. An information recording and reproducing apparatus comprising an information head device recording information on an information recording medium or reproducing the information recorded on said information recording medium, an optical head device positioning said information head device, a moving means relatively moving the position of said information head device and said information recording medium, wherein an optical head device according to claim 3 is used as said optical head device.

14. An information recording and reproducing apparatus comprising an information head device recording information on an information recording medium or reproducing the information recorded on said information recording medium, an optical head device positioning said information head device, a moving means relatively moving the position of said information head device and said information recording medium, wherein an optical head device according to claim 4 is used as said optical head device.

15. The information recording and reproducing apparatus according to claim 11, wherein said optical head device serves as said information head device.

16. The information recording and reproducing apparatus according to claim 12, wherein said optical head device serves as said information head device.

17. The information recording and reproducing apparatus according to claim 13, wherein said optical head device serves as said information head device.

18. The information recording and reproducing apparatus according to claim 14, wherein said optical head device serves as said information head device.

* * * * *